US012626647B2

(12) United States Patent
Lin et al.

(10) Patent No.: US 12,626,647 B2
(45) Date of Patent: May 12, 2026

(54) DISPLAY DRIVING DEVICE AND DISPLAY DRIVING METHOD

(71) Applicant: AUO Corporation, Hsinchu City (TW)

(72) Inventors: Chih-Lung Lin, Hsinchu City (TW); Cheng-Rui Lu, Hsinchu City (TW); Cheng-Han Ke, Hsinchu City (TW); Ming-Yang Deng, Hsinchu City (TW); Chia-Tien Peng, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 28 days.

(21) Appl. No.: 18/931,119

(22) Filed: Oct. 30, 2024

(65) Prior Publication Data

US 2025/0148968 A1 May 8, 2025

(30) Foreign Application Priority Data

Nov. 7, 2023 (TW) ................................ 112142929

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0852* (2013.01); *G09G 2300/0861* (2013.01); *G09G 2310/066* (2013.01); *G09G 2310/08* (2013.01); *G09G 2330/021* (2013.01)

(58) Field of Classification Search
CPC .................. G09G 3/32; G09G 3/3233; G09G 2300/0852; G09G 2300/0861; G09G 2310/066; G09G 2310/08; G09G 2330/021
See application file for complete search history.

(56) References Cited

U.S. PATENT DOCUMENTS

| | | | | |
|---|---|---|---|---|
| 11,138,925 | B1 * | 10/2021 | Wang | G09G 3/32 |
| 2022/0114947 | A1 * | 4/2022 | Chang | G09G 3/30 |
| 2022/0246088 | A1 * | 8/2022 | Zhai | G09G 3/32 |
| 2024/0029630 | A1 | 1/2024 | Lin et al. | |

FOREIGN PATENT DOCUMENTS

| | | | |
|---|---|---|---|
| TW | 202147282 | A | 12/2021 |
| TW | I819853 | B | 10/2023 |
| TW | 202418249 | A | 5/2024 |
| TW | I857708 | B | 10/2024 |

* cited by examiner

*Primary Examiner* — Nathan P Brittingham
(74) *Attorney, Agent, or Firm* — WPAT, PC

(57) ABSTRACT

A display driving device includes a light emitting circuit, a control circuit, and a boost circuit. The light emitting circuit is coupled to a first node. The light emitting circuit is configured to emit according to a first emission signal, a second emission signal, and a voltage level at the first node. The control circuit is coupled to a second node. The control circuit is configured to charge the second node according to a sweep signal and the first emission signal. The boost circuit is configured to boost and charge a voltage level at the second node to the first node. The voltage level at the first node is greater than the voltage level at the second node.

18 Claims, 14 Drawing Sheets

100

200B

DISPLAY DRIVING DEVICE AND DISPLAY DRIVING METHOD

CROSS-REFERENCE TO RELATED APPLICATION

This application claims priority to Taiwan Application Serial Number 112142929, filed Nov. 7, 2023, which is herein incorporated by reference in its entirety.

BACKGROUND

Field of Invention

The present disclosure relates to a driving device and a driving method, and more particularly to a display driving device and a display driving method.

Description of Related Art

Currently, in order to achieve high brightness uniformity, a display adopts a multi-emission architecture to emit light and adjust display grayscale.

However, the aforementioned architecture has issues such as the need to increase the driving cross-voltage and longer raising time and falling time, leading to an increase in the power consumption of the display. Therefore, how to design a solution to address the above problems is an important issue in this field.

SUMMARY

The summary aims to provide a simplified overview of the present disclosure to give the reader a basic understanding. This summary is not a complete overview of the present disclosure and is not intended to highlight important/critical elements of the embodiments or define the scope of the present disclosure.

One technical aspect of the present disclosure relates to a display driving device. The display driving device includes a light-emitting circuit, a control circuit, and a boost circuit. The light-emitting circuit is coupled to a first node. The light-emitting circuit is configured to emit light based on a first emission signal, a second emission signal, and the voltage level at the first node. The control circuit is coupled to a second node. The control circuit is configured to charge the second node based on a sweep signal and the first emission signal. The boost circuit is configured to boost the voltage level at the second node and charge it to the first node. The voltage level at the first node is greater than the voltage level at the second node.

Another technical aspect of the present disclosure relates to a display driving device. The display driving device includes a driving transistor, a transistor, a control circuit and a boost circuit. The driving transistor is configured to control a pulse amplitude of a driving current provided to a light emitter according to a pulse amplitude modulation data voltage. The transistor is connected in series with the driving transistor between a trace of a power supply signal and a trace of a pull-down signal. The boost circuit is connected to a gate terminal of the transistor. The control circuit is connected through the boost circuit to the gate terminal of the transistor, and the control circuit is configured to control the transistor according to a pulse width modulation data voltage and a sweep signal to control a pulse width of a driving current. The boost circuit is configured to boost a voltage level at the gate terminal of the transistor when the control circuit turns on the transistor.

The other technical aspect of the present disclosure relates to a display driving method for driving a display driving device. The display driving device comprising a light-emitting circuit, a control circuit and a boost circuit. The light-emitting circuit is coupled to a first node. The control circuit is coupled to a second node different from the first node. The boost circuit is coupled between the light-emitting circuit and the control circuit. The display driving method includes the following steps: emitting light by the light-emitting circuit based on the first emission signal, the second emission signal, and the voltage level at the first node; charging the second node by the control circuit based on the sweep signal and the first emission signal; and raising the voltage level at the second node and charging it to the first node by the boost circuit. The voltage level at the first node is greater than the voltage level at the second node.

Therefore, according to the present disclosure, the display driving device and display driving method shown in the embodiments of the present disclosure can increase the turn-on voltage of the transistor in the light-emitting circuit through the boost circuit, allowing for operating the transistor in the linear region.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Various features and elements in the drawings are not drawn to scale, and the drawings are made to present specific features and elements related to the present disclosure. Additionally, similar or identical element symbols are used to refer to similar elements/components across different figures.

DETAILED DESCRIPTION

Figure 1:
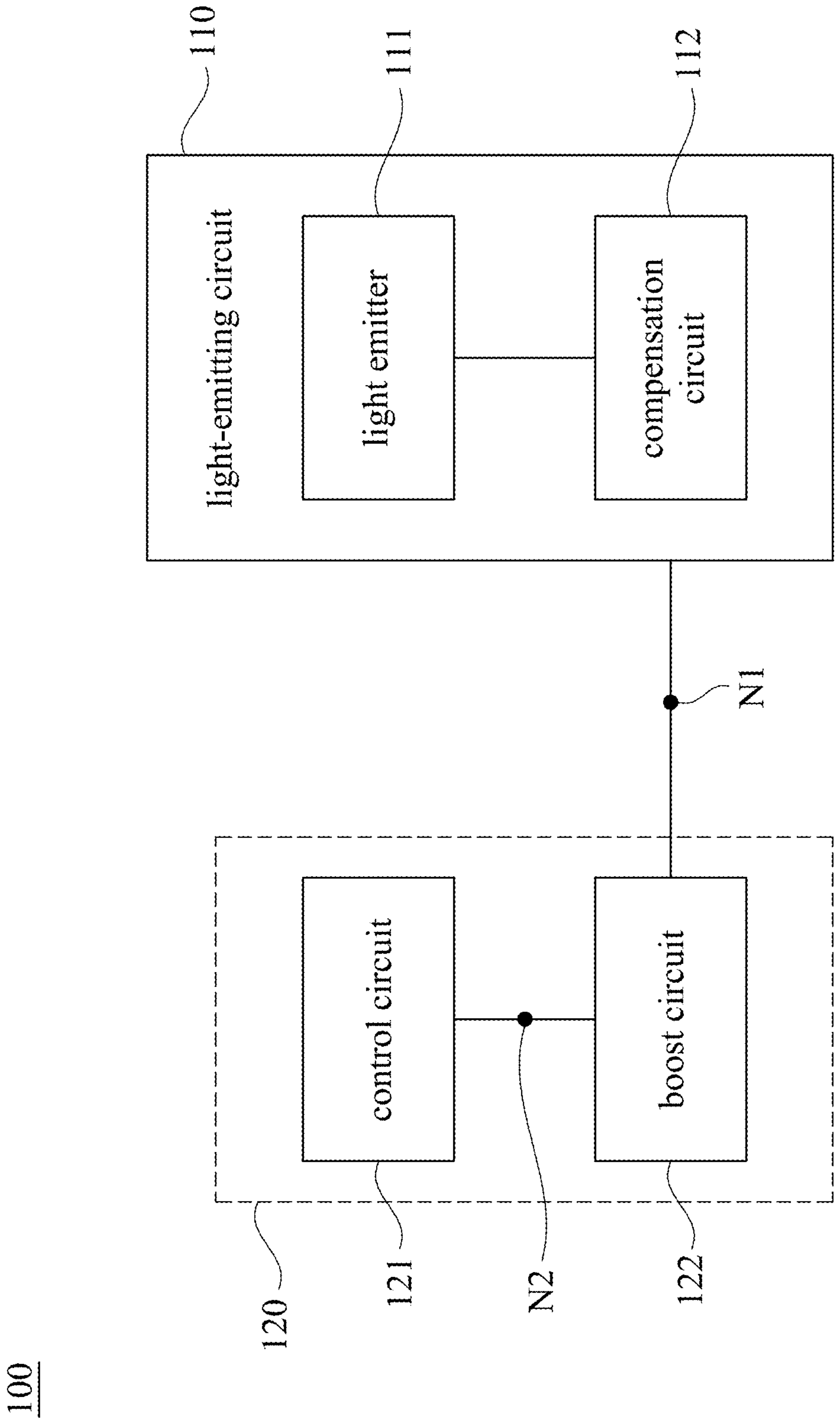
FIG. 1 is a block diagram illustrating a display driving device according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

To make the description of the present disclosure more detailed and complete, illustrative descriptions of embodiments and specific examples of the present disclosure are provided below. However, these are not the only forms of implementing or applying the specific examples of the present disclosure. The embodiments include features of multiple specific examples and the method steps and their sequences for constructing and operating these specific examples. However, other specific examples may also be used to achieve the same or equivalent functions and step sequences.

Unless otherwise defined in this specification, the scientific and technical terms used herein have the same meanings as understood and commonly used by those skilled in the art to which the present disclosure pertains. Furthermore, unless the context clearly dictates otherwise, singular nouns used in this specification encompass their plural forms, and plural nouns encompass their singular forms.

Additionally, the terms "coupled" or "connected" used herein can refer to two or more elements being in direct physical or electrical contact with each other, or being in indirect physical or electrical contact with each other, or refer to two or more elements operating or acting in conjunction with each other.

In this document, the term "circuit" broadly refers to an object that processes signals, consisting of one or more transistors and/or one or more active or passive components connected in a certain manner.

Certain terms are used in the specification and claims to refer to specific elements. However, those skilled in the art will understand that the same element may be referred to by different terms. The specification and claims do not distinguish elements by the difference in names but by the difference in their functions. The term "comprising" as used in the specification and claims is an open-ended term, and should be interpreted as "including but not limited to."

FIG. 1 is a block diagram illustrating a display driving device according to an embodiment of the present disclosure. As shown in FIG. 1, in one embodiment, the display driving device 100 includes a light-emitting circuit 110 and a driving circuit 120. The light-emitting circuit 110 includes a light emitter 111 and a compensation circuit 112. The driving circuit 120 includes a control circuit 121 and a boost circuit 122. In terms of connection relationships, the light-emitting circuit 110 and the boost circuit 122 are coupled to node N1, the control circuit 121 and the boost circuit 122 are coupled to node N2, and the light emitter 111 is coupled to the compensation circuit 112.

Figure 2:
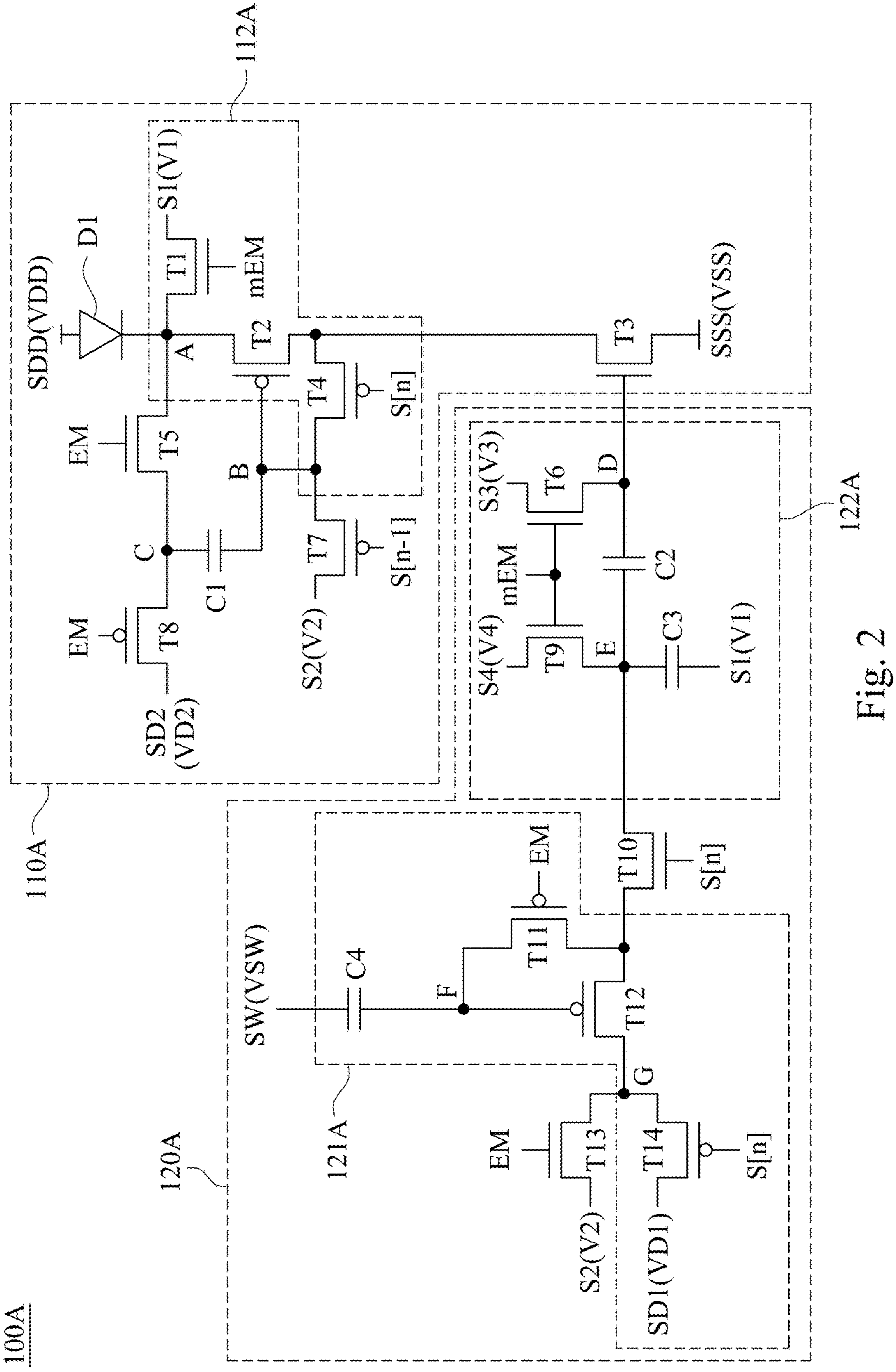
FIG. 2 is a detailed circuit diagram illustrating a display driving device according to an embodiment of the present disclosure.

FIG. 2 is a detailed circuit diagram illustrating a display driving device according to an embodiment of the present disclosure. As shown in FIG. 2, in some embodiments, the display driving device 100A includes a light-emitting circuit 110A, a light emitter D1, a compensation circuit 112A, and a driving circuit 120A. The driving circuit 120A includes a control circuit 121A and a boost circuit 122A.

For example, the display driving device 100A, light-emitting circuit 110A, light emitter D1, compensation circuit 112A, driving circuit 120A, control circuit 121A, and boost circuit 122A in FIG. 2 can correspond to the display driving device 100, light-emitting circuit 110, light emitter 111, compensation circuit 112, driving circuit 120, control circuit 121, and boost circuit 122 in FIG. 1, respectively, but the present disclosure is not limited to this.

Additionally, node N1 and node N2 in FIG. 1 can correspond to terminal D and terminal E in FIG. 2, respectively, but the present disclosure is not limited to this.

In some embodiments, operationally, the light-emitting circuit 110A is configured to emit light based on the emission signal EM, emission signal mEM, and the voltage level at the node N1. The control circuit 121A is configured to charge node N2 based on the sweep signal SW and the emission signal EM. The boost circuit 122A is configured to boost the voltage level at the node N2 and charge it to node N1. The voltage level at the node N1 is greater than the voltage level at the node N2.

For example, node N1 in FIG. 1 can correspond to terminal D in FIG. 2, and node N2 in FIG. 1 can correspond to terminal E in FIG. 2, but the present disclosure is not limited to this.

In some embodiments, the light-emitting circuit 110A includes transistors T1 to T5, T7, T8, a light emitter D1, and a capacitor C1. The capacitor C1 includes terminal B and terminal C. One terminal of transistor T1 is configured to receive a pull-up signal S1, the other terminal of transistor T1 is coupled to terminal A, and the control terminal of transistor T1 is configured to receive the emission signal mEM. One terminal of transistor T2 is coupled to terminal A, the control terminal of transistor T2 is coupled to terminal B, and the other terminal of transistor T2 is coupled to transistor T3. One terminal of transistor T3 is coupled to transistor T2, the control terminal of transistor T3 is coupled to terminal D, and the other terminal of transistor T3 is configured to receive a pull-down signal SSS. One terminal of transistor T4 is coupled to transistor T2, the control terminal of transistor T4 is configured to receive a scan signal S[n], and the other terminal of transistor T4 is coupled to terminal B.

In this embodiment, one terminal of transistor T5 is coupled to terminal A, the control terminal of transistor T5 is configured to receive the emission signal EM, and the other terminal of transistor T5 is coupled to terminal C. One terminal of transistor T7 is configured to receive a charge signal S2, the other terminal of transistor T7 is coupled to terminal B, and the control terminal of transistor T7 is configured to receive a scan signal S[n−1]. One terminal of the light emitter D1 is configured to receive a power supply signal SDD, and the other terminal of the light emitter D1 is coupled to terminal A. One terminal of transistor T8 is configured to receive a data signal SD2, the control terminal of transistor T8 is configured to receive the emission signal EM, and the other terminal of transistor T8 is coupled to terminal C. In some embodiments, a voltage of the data signal SD2 can be considered as a pulse amplitude modulation data voltage.

In some embodiments, transistors T1, T2, T4 can form the compensation circuit 112A, and transistors T11, T12, T14, and capacitor C4 can form the control circuit 121A, but the present disclosure is not limited to this.

In some embodiments, the control circuit 121A includes transistors T6, T9 to T14, and capacitors C2 to C4. In some embodiments, the capacitor C2 can be considered as a boost capacitor. In some embodiments, the capacitor C2 is coupled between the control circuit 121A and a gate terminal of the transistor T3, and the capacitor C2 is configured to boost the voltage level at the gate terminal of the transistor T3. Capacitor C2 has terminal D and terminal E. Capacitor C4 has terminal F. One terminal of transistor T6 is configured to receive a pull-down signal S3, the other terminal of transistor T6 is coupled to terminal D, and the control terminal of transistor T6 is configured to receive the emission signal mEM. One terminal of transistor T9 is configured to receive a pull-down signal S4, the other terminal of transistor T9 is coupled to terminal E, and the control terminal of transistor T9 is configured to receive the emission signal mEM. One terminal of capacitor C3 is configured to receive a pull-up signal S1, and the other terminal of capacitor C3 is coupled to terminal E.

In this embodiment, one terminal of transistor T10 is coupled to terminal E, the other terminal of transistor T10 is coupled to transistor T11, and the control terminal of transistor T10 is configured to receive a scan signal S[n]. One terminal of transistor T11 is coupled to transistor T10, the other terminal of transistor T11 is coupled to terminal F, and the control terminal of transistor T11 is configured to receive the emission signal EM. The other terminal of capacitor C4 is configured to receive the sweep signal SW. One terminal of transistor T12 is coupled to transistor T10, the other terminal of transistor T12 is coupled to terminal G, and the control terminal of transistor T12 is coupled to terminal F. One terminal of transistor T13 is configured to receive a charge signal S2, the other terminal of transistor T13 is coupled to terminal G, and the control terminal of transistor T13 is configured to receive the emission signal EM. One terminal of transistor T14 is configured to receive a data signal SD1, the other terminal of transistor T14 is coupled to terminal G, and the control terminal of transistor T14 is configured to receive a scan signal S[n]. In some embodiments, the voltage of the data signal SD1 can be considered as a pulse width modulation data voltage.

In some embodiments, transistors T6, T9, and capacitors C2, C3 can form the boost circuit 122A.

In some embodiments, transistors T11, T12, T14, and capacitor C4 can form the control circuit 121A.

In some embodiments, transistors T1 to T14 can be of any type of transistor.

For example, transistors T1 to T14 can be P-type Metal Oxide Semiconductor (PMOS) transistors, N-type Metal Oxide Semiconductor (NMOS) transistors, Thin Film Transistors (TFTs), or other different types of switching elements, but the present disclosure is not limited to this.

Furthermore, transistors T1, T3, T5, T6, T9, T10, T13 can be N-type thin-film transistors, and transistors T2, T4, T7, T8, T11, T12, T14 can be P-type thin-film transistors, but the present disclosure is not limited to this.

In some embodiments, the pull-up signal S1 has a voltage level V1. The charge signal S2 has a voltage level V2. The pull-down signal S3 has a voltage level V3. The pull-down signal S4 has a voltage level V4. The sweep signal SW has a voltage level VSW. The data signal SD1 has a voltage level VD1. The data signal SD2 has a voltage level VD2. The power supply signal SDD has a voltage level VDD. The pull-down signal SSS has a voltage level VSS.

In some embodiments, the voltage level VD2 is greater than the voltage level V1. The voltage level V1 is greater than the voltage level VDD. The voltage level VDD is greater than the voltage level V2. The voltage level V2 is greater than the voltage level V3. The voltage level V3 is equal to the voltage level VSS. The voltage level VSS is greater than the voltage level V4.

For example, the voltage level VD2 can be 12 volts (V), the voltage level V1 can be 10 volts, the voltage level VDD can be 7 volts, the voltage level V2 can be 5 volts, the voltage level V3 can be 0 volts, the voltage level VSS can be 0 volts, and the voltage level V4 can be −2 volts, but the present disclosure is not limited to this.

In some embodiments, the voltage level VD1 can be greater than the voltage level V2, but the present disclosure is not limited to this.

In some embodiments, the light-emitting circuit 110A can correspond to a Pulse Amplitude Modulation (PAM) circuit. The driving circuit 120A can correspond to a Pulse Width Modulation (PWM) circuit.

In some embodiments, the light emitter D1 can be various types of light-emitting diodes. For example, the light emitter D1 can be a Micro LED, a Mini LED, or an Organic LED (OLED), but the present disclosure is not limited to this. Additionally, the light emitter D1 can be a light-emitting diode of various colors, such as red, green, or blue, but the present disclosure is not limited to this.

In some embodiments, the display can have a scanning device and the display driving device 100, with the scanning device coupled to the display driving device 100, and the scanning device can provide multiple scan signals to the display driving device 100 via multiple scan lines.

For example, the plurality of scan signals can be scan signals S[n−1] and S[n], and n can be a positive integer greater than 2, but the present disclosure is not limited to this.

In one embodiment, the light-emitting circuit 110A includes the light emitter D1 and the compensation circuit 112A. The cathode terminal of the light emitter D1 is coupled to the compensation circuit 112A, and the anode terminal of the light emitter D1 receives the power supply signal SDD.

Please refer to both FIG. 1 and FIG. 2. In one embodiment, the boost circuit 122A is further used to discharge node N1 and node N2 based on the emission signal mEM.

For example, node N1 can correspond to terminal D in FIG. 2, node N2 can correspond to terminal E in FIG. 2, and the boost circuit 122A can turn on transistors T6 and T9 via the emission signal mEM to discharge terminals D and E, but the present disclosure is not limited to this.

Figure 3:
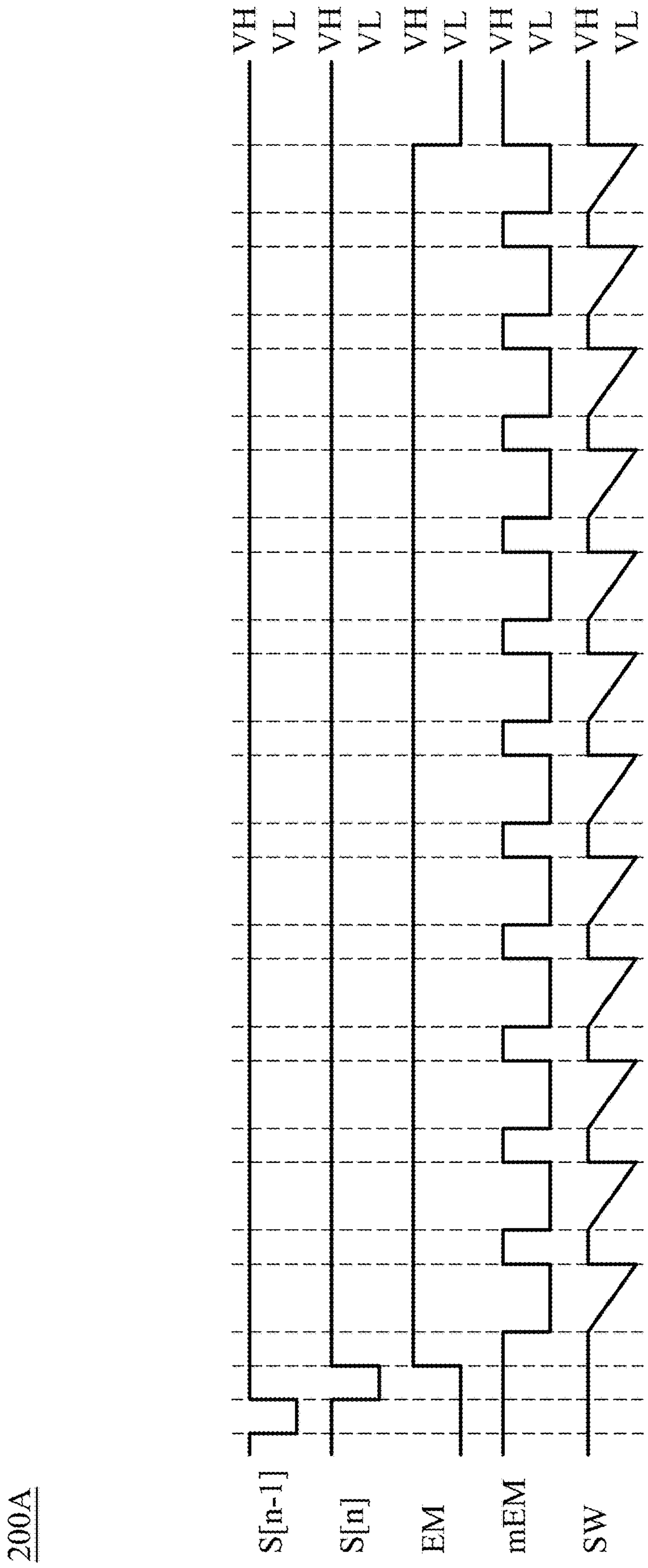
FIG. 3 is a timing level diagram of multiple signals of a display driving device according to an embodiment of the present disclosure.

FIG. 3 is a timing level diagram of multiple signals of a display driving device according to an embodiment of the present disclosure. As shown in FIG. 3, in some embodiments, the timing diagram 200A of FIG. 3 includes a scan signal S[n−1], a scan signal S[n], a emission signal EM, a emission signal mEM, and a sweep signal SW.

For example, the scan signal S[n−1], scan signal S[n], emission signal EM, emission signal mEM, and sweep signal SW in FIG. 3 can each correspond to the scan signal S[n−1], scan signal S[n], emission signal EM, emission signal mEM, and sweep signal SW in FIG. 2, but the present disclosure is not limited to this.

In some embodiments, the scan signal S[n−1] can operate between voltage levels VH and VL. The scan signal S[n] can operate between voltage levels VH and VL. The emission signal EM can operate between voltage levels VH and VL. The emission signal mEM can operate between voltage levels VH and VL. The sweep signal SW can operate between voltage levels SH, SM, and SL. The voltage level SM is between the voltage levels SH and SL.

For example, the absolute value of the potential difference between voltage levels VH and VL can be 20 volts, the absolute value of the potential difference between voltage levels SH and SL can be 10 volts, the voltage level VH can be 15 volts, the voltage level VL can be −5 volts, the voltage level SH can be 15 volts, and the voltage level SL can be 5 volts, but the present disclosure is not limited to this.

In some embodiments, the timing diagram 200A of FIG. 3 can be considered as one frame.

For example, the display driving device 100A in FIG. 2 can perform the operations of the timing diagram 200A to complete one frame of light emission operation, but the present disclosure is not limited to this.

Please refer to both FIG. 2 and FIG. 3. In some embodiments, the voltage level VL can be the disable voltage level for multiple transistors T1, T3, T5, T6, T9, T10, T13, and the voltage level VH can be the enable voltage level for multiple transistors T1, T3, T5, T6, T9, T10, T13. The voltage level VL can be the enable voltage level for multiple transistors T2, T4, T7, T8, T11, T12, T14, and the voltage level VH can be the disable voltage level for multiple transistors T2, T4, T7, T8, T11, T12, T14.

For example, multiple transistors T1, T3, T5, T6, T9, T10, T13 can be turned off based on the voltage level VL, multiple transistors T1, T3, T5, T6, T9, T10, T13 can be turned on based on the voltage level VH, multiple transistors T2, T4, T7, T8, T11, T12, T14 can be turned on based on the voltage level VL, and multiple transistors T2, T4, T7, T8, T11, T12, T14 can be turned off based on the voltage level VH, but the present disclosure is not limited to this.

Figure 4:
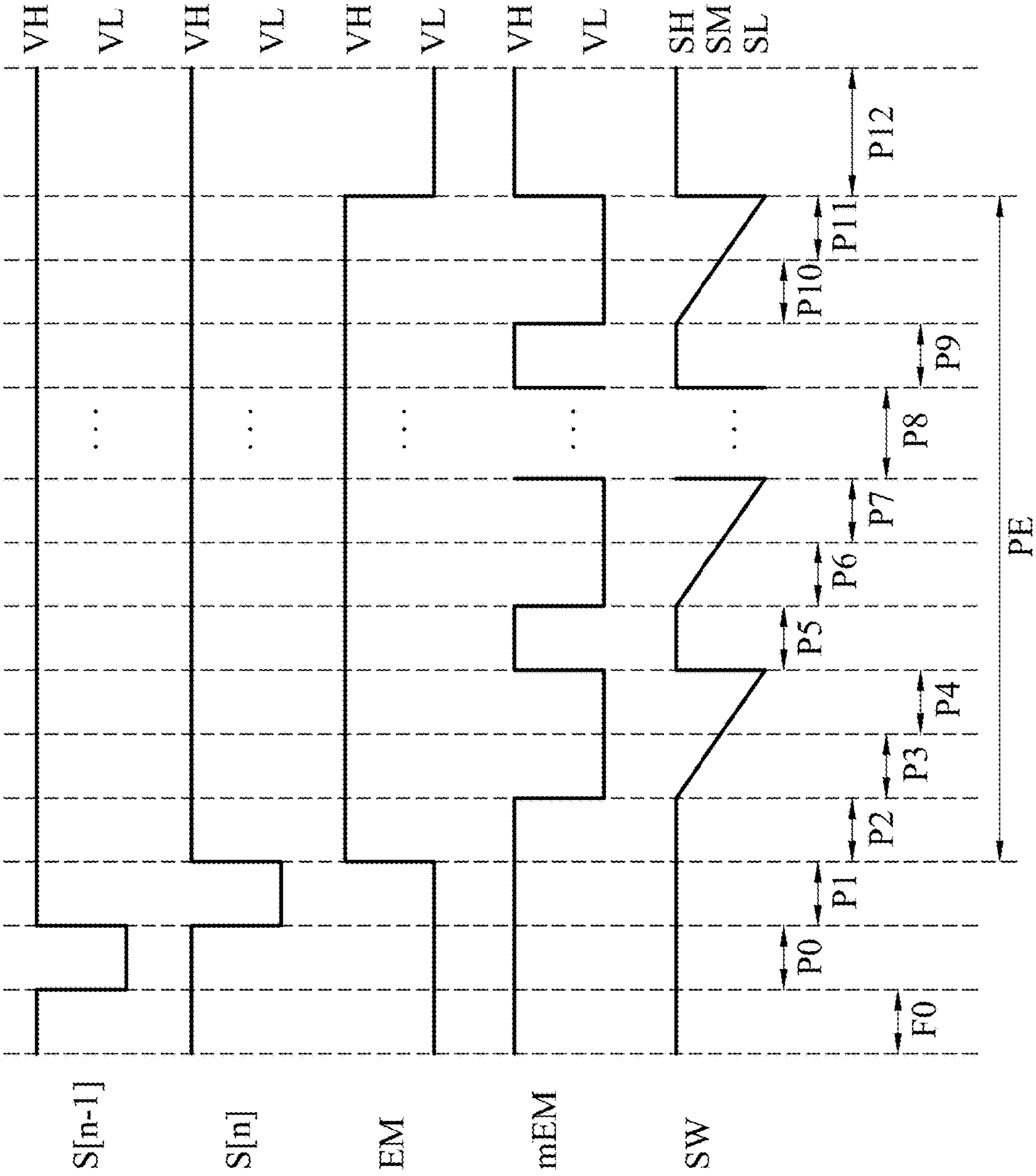
FIG. 4 is a timing level diagram of multiple signals of a display driving device according to an embodiment of the present disclosure.

FIG. 4 is a timing level diagram of multiple signals of a display driving device according to an embodiment of the present disclosure. As shown in FIG. 4, in some embodiments, the timing diagram 200B of FIG. 4 sequentially includes periods F0, P0 to P12.

For example, the timing diagram 200B corresponds to the operations of different signals shown in FIG. 2, such as the operations of scan signal S[n−1], scan signal S[n], emission signal EM, emission signal mEM, and sweep signal SW, but the present disclosure is not limited to this.

In some embodiments, period PE includes periods P2 to P11. Additionally, the time length of period P0 can be 1H, the time length of period P2 can be 1H, the time lengths of periods P3 and P4 can be 2H, and the time length of period PE can be 36H, but the present disclosure is not limited to this.

Please refer to both FIG. 3 and FIG. 4. In some embodiments, the timing diagram 200B of FIG. 4 corresponds to the timing diagram 200A of FIG. 3.

For example, some periods of the timing diagram 200B in FIG. 4 overlap with some periods of the timing diagram 200A in FIG. 3. In the overlapping periods, the operations of the timing diagram 200B are similar to the operations of the timing diagram 200A. To keep the description concise, further details are not repeated here.

Figure 5:
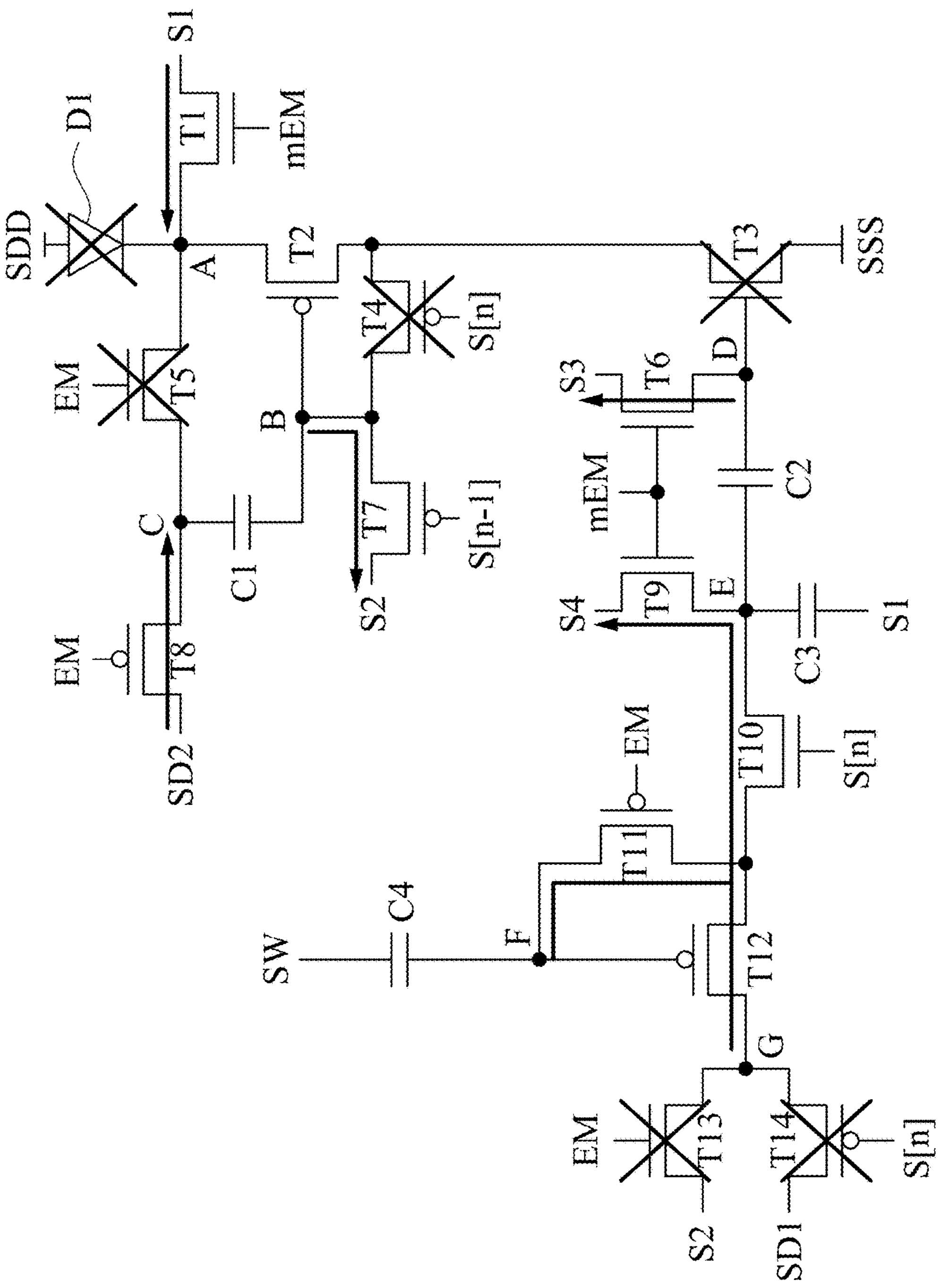
FIG. 5 is an operation scenario diagram illustrating a display driving device according to an embodiment of the present disclosure.

FIG. 5 is an operation scenario diagram illustrating a display driving device according to an embodiment of the present disclosure. As shown in FIG. 5, in some embodiments, FIG. 5 can represent part of the operation of the display driving device 100A from FIG. 2 executing the timing diagram 200B from FIG. 4.

For example, FIG. 5 can illustrate the operation of the display driving device 100A during period P0 of the timing diagram 200B.

Please refer to FIG. 2, FIG. 4, and FIG. 5 together. In one embodiment, the light-emitting circuit 110A includes a capacitor C1, the control circuit 121A includes a capacitor C4, and the boost circuit 122A includes a capacitor C2. Capacitor C1 includes terminals C and B, capacitor C4 includes terminal F, and capacitor C2 includes terminals E and D.

In this embodiment, during period P0, the light-emitting circuit 110A adjusts the voltage levels at the terminal C and the terminal B based on the data signal SD2 and the charge signal S2.

For example, during period P0, multiple transistors T3 to T5 of the light-emitting circuit 110A can be turned off, transistor T1 is turned on based on the emission signal mEM, and transistor T1 provides the pull-up signal S1 to terminal A to adjust the voltage level at the terminal A to voltage level V1. Transistor T8 is turned on based on the emission signal EM, and transistor T8 provides the data signal SD2 to terminal C to adjust the voltage level at the terminal C to voltage level VD2. Transistor T7 is turned on based on the scan signal S[n−1], and transistor T7 provides the charge signal S2 to terminal B to adjust the voltage level at the terminal B to voltage level V2, but the present disclosure is not limited to this.

In this embodiment, during period P0, the control circuit 121A adjusts the voltage level at the terminal F based on the pull-down signal S4.

For example, during period P0, multiple transistors T13 and T14 of the driving circuit 120 can be turned off, transistor T11 is turned on based on the emission signal EM, transistor T10 is turned on based on the scan signal S[n], and transistor T9 is turned on based on the emission signal mEM. Transistors T9 to T11 provide the pull-down signal S4 to terminal F to adjust the voltage level at the terminal F to voltage level V4. Transistor T9 is turned on based on the voltage level V4 of terminal F, and transistors T9, T10, and T12 provide the pull-down signal S4 to terminal G to adjust the voltage level at the terminal G to a voltage level (V4+|VTH_T12|), where the threshold voltage level |VTH_T12| can be the threshold voltage level at the transistor T12, but the present disclosure is not limited to this.

In this embodiment, during period P0, the boost circuit 122A adjusts the voltage levels at the terminal E and the terminal D based on the pull-down signal S4 and the pull-down signal S3. The voltage level V3 of the pull-down signal S3 is greater than the voltage level of the pull-down signal S4.

For example, during period P0, transistor T9 provides the pull-down signal S4 to terminal E to adjust the voltage level at the terminal E to voltage level V4. Transistor T6 is turned on based on the emission signal mEM, and transistor T6 provides the pull-down signal S3 to terminal D to adjust the voltage level at the terminal D to voltage level V3, but the present disclosure is not limited to this.

In some embodiments, period P0 can be referred to as the Reset Period, but the present disclosure is not limited to this.

Figure 6:
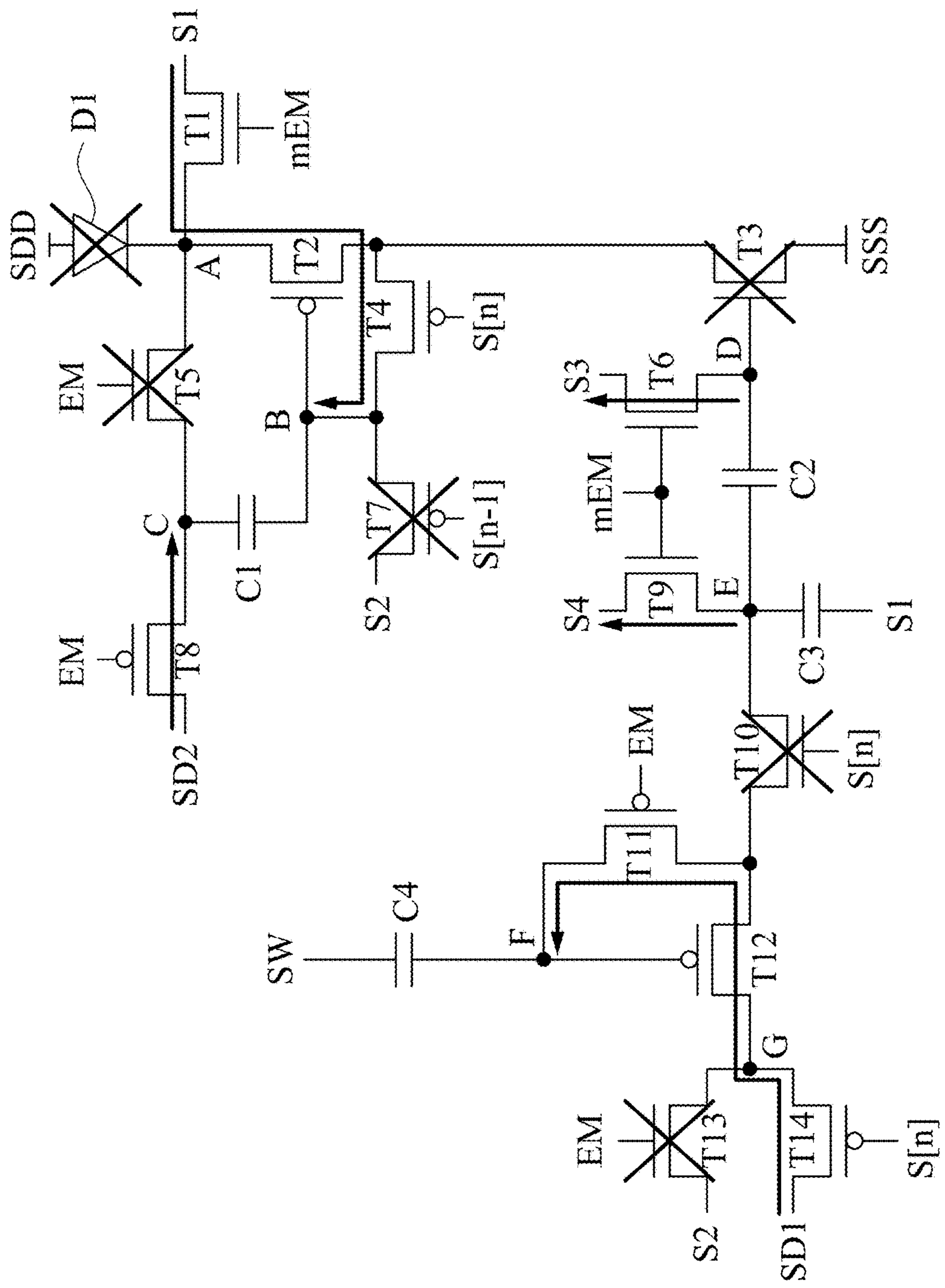
FIG. 6 is an operation scenario diagram illustrating a display driving device according to an embodiment of the present disclosure.

FIG. 6 is an operation scenario diagram illustrating a display driving device according to an embodiment of the present disclosure. As shown in FIG. 6, in some embodiments, FIG. 6 can represent part of the operation of the display driving device 100A from FIG. 2 executing the timing diagram 200B from FIG. 4.

For example, FIG. 6 can illustrate the operation of the display driving device 100A during period P1 of the timing diagram 200B.

Please refer to FIG. 2, FIG. 4, and FIG. 6 together. In one embodiment, the light-emitting circuit 110A further includes a driving transistor T2, and the driving transistor has a threshold voltage level |VTH_T2|. The control circuit 121A further includes a control transistor T12, and the control transistor T12 has a threshold voltage level |VTH_T12|.

In this embodiment, during period P1, the light-emitting circuit 110A adjusts the voltage level at the terminal B based on the pull-up signal S1 and the threshold voltage level |VTH_T2|.

For example, during period P1, transistors T3, T5, and T7 of the light-emitting circuit 110A can be turned off, transistor T1 is turned on based on the emission signal mEM, transistor T2 is turned on based on the voltage level at the terminal B, and transistor T4 is turned on based on the scan signal S[n]. Transistors T1, T2, and T4 provide the pull-up signal S1 to terminal B to adjust the voltage level at the terminal B to a voltage level (V1−|VTH_T2|). Transistor T8 is turned on based on the emission signal EM, and transistor T8 provides the data signal to terminal C to maintain the voltage level VD2 of terminal C, but the present disclosure is not limited to this. Additionally, transistor T1 provides the pull-up signal S1 to terminal A to maintain the voltage level V1 of terminal A.

In this embodiment, during period P1, the control circuit 121A adjusts the voltage level at the terminal F based on the data signal SD1 and the threshold voltage level |VTH_T12|.

For example, during period P1, multiple transistors T10 and T13 of the driving circuit 120A can be turned off, transistor T11 is turned on based on the emission signal EM, transistor T12 is turned on based on the voltage level at the terminal F, and transistor T14 is turned on based on the scan signal S[n]. Multiple transistors T11, T12, and T14 provide the data signal SD2 to terminal F to adjust the voltage level at the terminal F to a voltage level (VD1−|VTH_T12|). Transistor T14 provides the data signal SD2 to terminal G to adjust the voltage level at the terminal G to voltage level VD1.

In some embodiments, during period P1, transistor T9 is turned on based on the emission signal mEM, and transistor T9 provides the pull-down signal S4 to terminal E to maintain the voltage level V4 of terminal E. Transistor T6 is turned on based on the emission signal mEM, and transistor T6 provides the pull-down signal S3 to terminal D to maintain the voltage level V3 of terminal D, but the present disclosure is not limited to this.

In some embodiments, period P1 can be referred to as the Compensation and Data Input Period, but the present disclosure is not limited to this. In summary, the display driving device 100A can compensate for the threshold voltage variation of transistor T2 through transistors T1, T2, and T4, and compensate for the threshold voltage variation of transistor T2 through transistors T11, T12, and T14, but the present disclosure is not limited to this.

Figure 7:
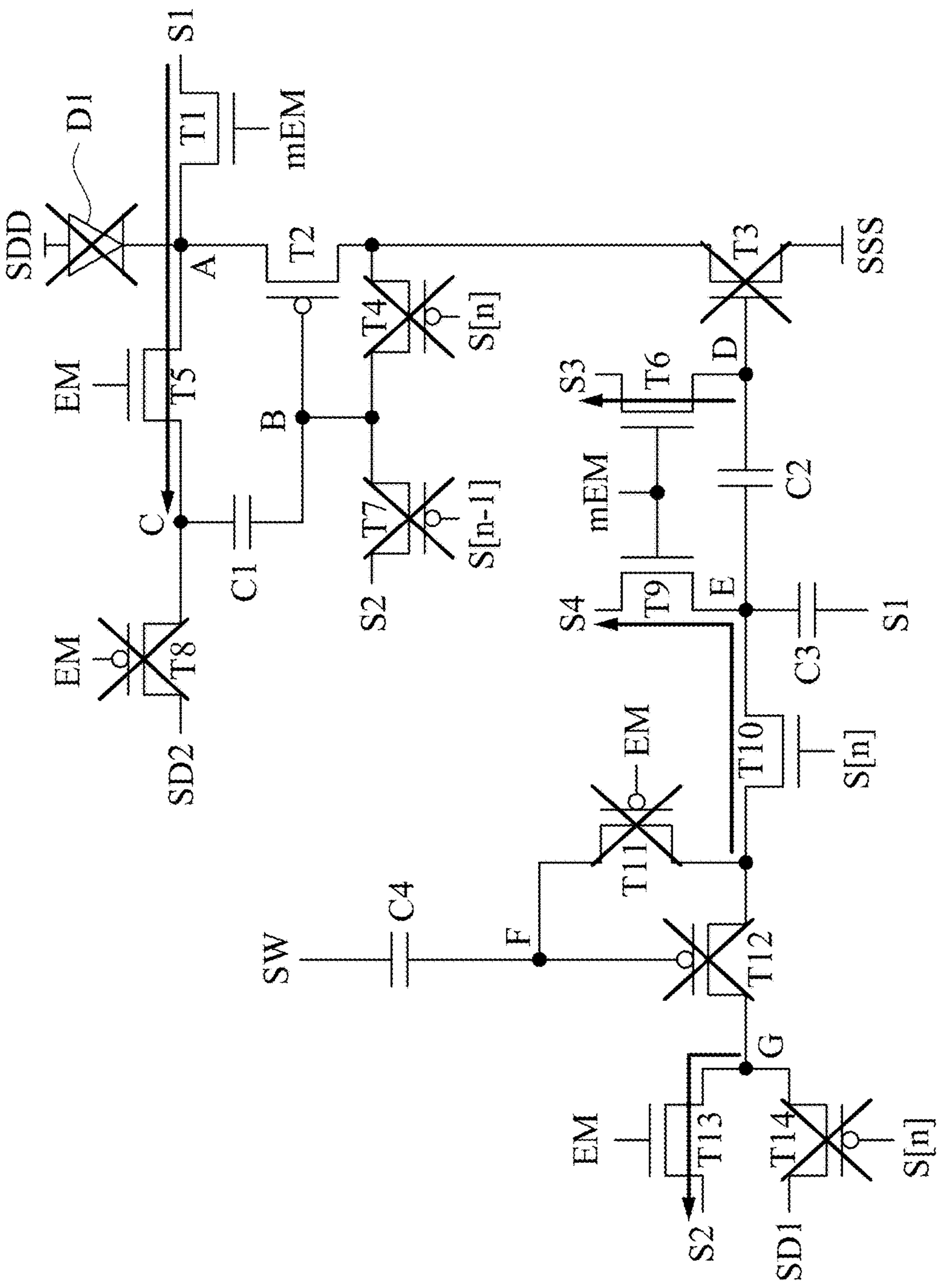
FIG. 7 is an operation scenario diagram illustrating a display driving device according to an embodiment of the present disclosure.

FIG. 7 illustrates an operation scenario of a display driving device according to an embodiment of the present disclosure. As shown in FIG. 7, in some embodiments, FIG. 7 may depict a part of the operation of the display driving device 100A from FIG. 2 executing the timing diagram 200B from FIG. 4.

For example, FIG. 7 may represent the operation of the display driving device 100A during the period P2 of the timing diagram 200B.

Please refer to FIG. 2, FIG. 4, and FIG. 7 together. In one embodiment, during the period P2, the light-emitting circuit 110A adjusts the voltage levels at the terminal C and the terminal B according to the pull-up signal S1.

For instance, during the period P2, the transistors T3, T4, T7, T8 of the light-emitting circuit 110A may be turned off. The transistor T1 is turned on according to the lighting signal mEM, and transistor T1 provides the pull-up signal S1 to terminal A to maintain the voltage level V1 at terminal A. Transistor T1 is turned on according to the lighting signal EM, and the transistors T1, T5 provide the pull-up signal S1 to terminal C to adjust the voltage level at the terminal C to the voltage level V1. Capacitor C1 adjusts the voltage level at the terminal B to the voltage level (2V1−|VTH_T2|−VD2) through capacitive coupling, but the present disclosure is not limited to this.

In some embodiments, during the period P2, the transistors T11, T12, T14 of the driving circuit 120A may be turned off, and terminal F maintains the voltage level (VD1−|VTH_T12|). Transistor T13 is turned on according to the lighting signal EM, and transistor T13 provides the charging signal S2 to terminal G to adjust the voltage level at the terminal G to the voltage level V2.

In some embodiments, during the period P2, transistor T9 is turned on according to the lighting signal mEM, and transistor T9 provides the pull-down signal S4 to terminal E to maintain the voltage level V4 at terminal E. Transistor T6 is turned on according to the lighting signal mEM, and transistor T6 provides the pull-down signal S3 to terminal D to maintain the voltage level V3 at terminal D, but the present disclosure is not limited to this.

In some embodiments, the period P2 may be referred to as the Stable Period, but the present disclosure is not limited to this.

Figure 8:
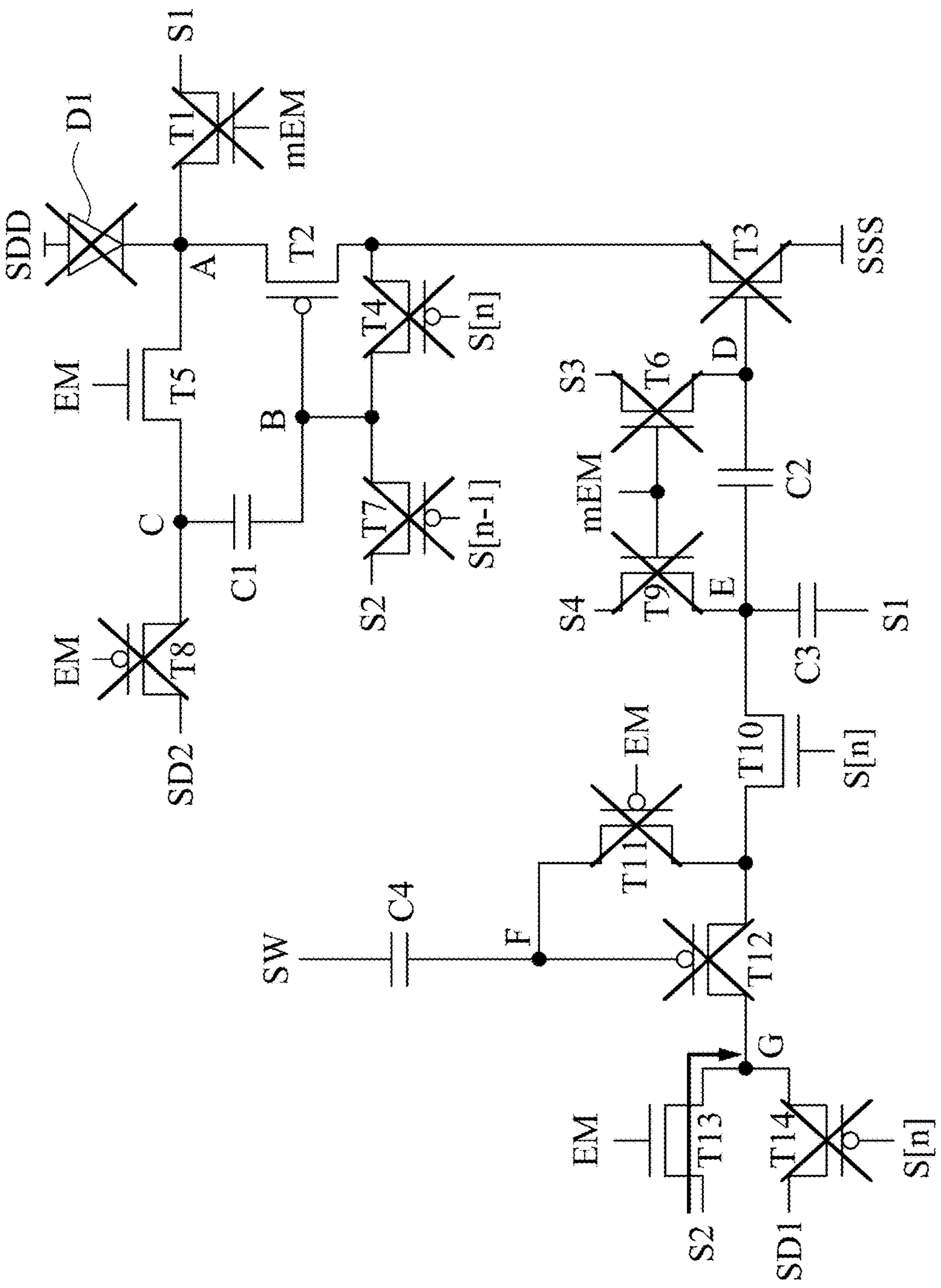
FIG. 8 is an operation scenario diagram illustrating a display driving device according to an embodiment of the present disclosure.

FIG. 8 illustrates an operation scenario of a display driving device according to an embodiment of the present disclosure. As shown in FIG. 8, in some embodiments, FIG. 8 may depict a part of the operation of the display driving device 100A from FIG. 2 executing the timing diagram 200B from FIG. 4.

For example, FIG. 8 may represent the operation of the display driving device 100A during the period P3 of the timing diagram 200B.

Please refer to FIG. 2, FIG. 4, and FIG. 8 together. In one embodiment, during the period P3, the control circuit 121A adjusts the voltage level at the terminal F according to the voltage change level ΔSW1 of the sweep signal SW.

For instance, during the period P3, the transistors T6, T9, T11, T12, T14 of the driving circuit 120A may be turned off, and the sweep signal SW may have a voltage change level ΔSW1. Capacitor C4 adjusts the voltage level at the terminal F to the voltage level (VD1−|VTH_T12|−ΔSW1) through capacitive coupling. Transistor T13 is turned on according to the lighting signal EM, and transistor T13 provides the charging signal S2 to terminal G to maintain the voltage level V2 at terminal G. Terminal E maintains the voltage level V4, and terminal D maintains the voltage level V3.

Additionally, the voltage change level ΔSW1 may be the difference between the voltage level SH and the voltage level SM, but the present disclosure is not limited to this.

In this embodiment, during the period P3, the control transistor T12 is turned off according to the voltage level at the terminal F.

For example, during the period P3, the voltage level (VD1−|VTH_T12|−ΔSW1) of terminal F has not yet reached the enabling voltage level of the control transistor T12, so the control transistor T12 is turned off, but the present disclosure is not limited to this.

In some embodiments, during the period P3, the transistors T1, T3, T4, T7, T8 of the light-emitting circuit 110A may be turned off, terminal A maintains the voltage level V1, terminal C maintains the voltage level V1, and terminal B maintains the voltage level (2V1−|VTH_T2|−VD2), but the present disclosure is not limited to this.

In some embodiments, the period P3 may be referred to as the First Emission Period, but the present disclosure is not limited to this.

Figure 9:
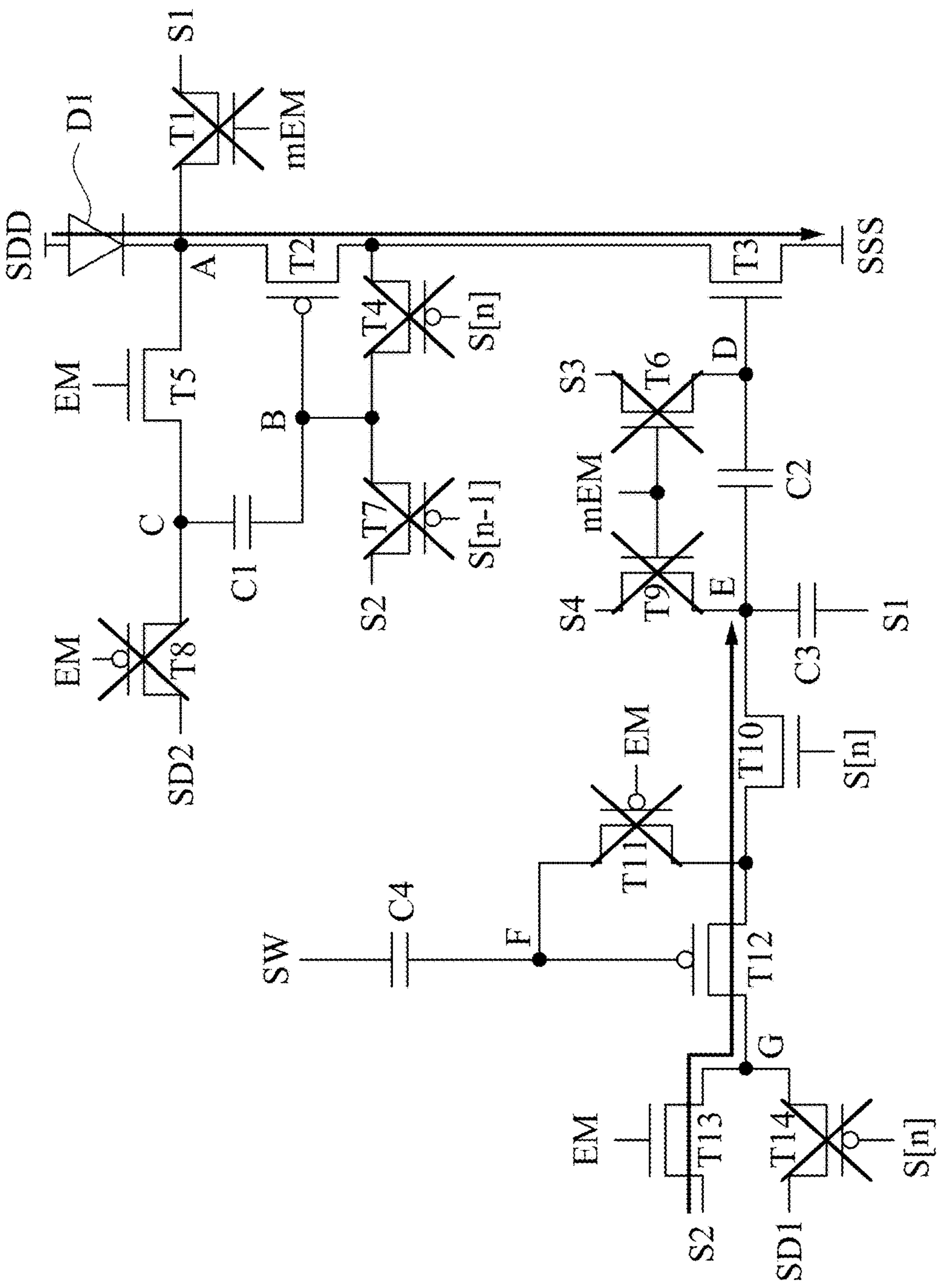
FIG. 9 is an operation scenario diagram illustrating a display driving device according to an embodiment of the present disclosure.

FIG. 9 illustrates an operation scenario of a display driving device according to an embodiment of the present disclosure. As shown in FIG. 9, in some embodiments, FIG. 9 may depict a part of the operation of the display driving device 100A from FIG. 2 executing the timing diagram 200B from FIG. 4.

For example, FIG. 9 may represent the operation of the display driving device 100A during the period P4 of the timing diagram 200B.

Please refer to FIG. 2, FIG. 4, and FIG. 9 together. In some embodiments, during the period P4, the control circuit 121A adjusts the voltage level at the terminal F according to the voltage change level ΔSW2 of the sweep signal SW, and the control transistor T12 is turned on according to the voltage level at the terminal F. During the fifth period P4, the boost circuit 122A adjusts the voltage level at the terminal E and the voltage level at the terminal D according to the charging signal S2, and the transistor T3 of the light-emitting circuit 110A is turned on according to the voltage level at the terminal D.

For instance, during the period P4, the transistors T6, T9, T11, T14 of the driving circuit 120A may be turned off, and the sweep signal SW may have a voltage change level ΔSW2. Capacitor C4 adjusts the voltage level at the terminal F to the voltage level (VD1−|VTH_T12|−ΔSW2) through capacitive coupling, and the control transistor T12 is turned on according to the voltage level (VD1−|VTH_T12|−ΔSW2) of terminal F. Transistor T13 is turned on according to the lighting signal EM, and transistor T13 provides the charging signal S2 to terminal G to maintain the voltage level V2 at terminal G. Transistor T10 is turned on according to the scan signal S[n], and the transistors T13, T12, T10 provide the charging signal S2 to terminal E to adjust the voltage level at the terminal E to the voltage level V2. Capacitor C2 adjusts the voltage level at the terminal D to the voltage level (V3−V4+V2) through capacitive coupling. The switch of the light-emitting circuit 110A may be transistor T3, but the present disclosure is not limited to this.

Specifically, for transistor T12, when the voltage level (VSG_T12) from the source to the gate is greater than the voltage level (|VTH_T12|), transistor T12 is turned on. During the period P4, transistor T12 may satisfy the following relationships 1 to 3.

$$VSG\_T12 > |VTH\_T12|. \quad \text{Relationship 1}$$

$$V2 - VD1 + |VTH\_T12| + +\Delta SW2 > |VTH\_T12|. \quad \text{Relationship 2}$$

$$\Delta SW2 > VD1 - V2. \quad \text{Relationship 3}$$

As mentioned above, Relationship 3 can be derived sequentially from Relationships 1 and 2, and when transistor T12 satisfies Relationship 3, transistor T12 is turned on, but the present disclosure is not limited to this.

In some embodiments, the voltage change level ΔSW2 is greater than the voltage change level ΔSW1, but the present disclosure is not limited to this. In some embodiments, the voltage change level ΔSW2 is equal to the voltage change level ΔSW1, but the present disclosure is not limited to this.

For example, the voltage change level ΔSW2 may be the difference between the voltage level SM and the voltage level SL, but the present disclosure is not limited to this.

In one embodiment, the light-emitter D1 of the light-emitting circuit 110A has a light-emitting diode voltage level (VLED). During the period P4, the light-emitting circuit 110A adjusts the voltage level at the terminal C and the voltage level at the terminal B according to the power supply signal SDD and the light-emitting diode voltage level (VLED).

For instance, during the period P4, the transistors T1, T4, T7, T8 of the light-emitting circuit 110A may be turned off, and transistors T2, T3 provide the pull-down signal SSS to the light-emitter D1, thus turning on the light-emitter D1. The light-emitter D1 provides the power supply signal SDD to terminal A to adjust the voltage level at the terminal A to the voltage level (VDD−VLED). Transistor T5 is turned on according to the lighting signal EM, and the light-emitter D1 and transistor T5 provide the power supply signal SDD to terminal C to adjust the voltage level at the terminal C to the voltage level (VDD−VLED). Capacitor C1 adjusts the voltage level at the terminal B to the voltage level (V1−|VTH_T2|−VD2+VDD−VLED) through capacitive coupling, and transistor T12 is turned on according to the voltage level (V1−|VTH_T2|−VD2+VDD−VLED) of terminal B.

In this embodiment, the driving transistor T2 outputs a driving signal (ILED) based on the voltage level at the terminal B, and the light-emitter D1 emits light according to the driving signal (ILED).

For example, the driving signal (ILED) may conform to the following relationships 4 to 5, but the present disclosure is not limited to this.

$$ILED = K \times (VDD - VLED - VDD + VLED - V1 + VD2 + |VTH\_T2| - |VTH\_T2|)^2. \quad \text{Relationship 4}$$

$$ILED = K \times (VD2 - V1)^2. \quad \text{Relationship 5}$$

As mentioned above, Relationship 5 can be derived from Relationship 4, and K can be any parameter. From Relationship 5, it is understood that the driving signal (ILED) is independent of the voltage level (|VTH_T2|) and the voltage level VDD, thereby achieving a compensating effect.

In some embodiments, the period P4 may be referred to as the Second Emission Period, but the present disclosure is not limited to this.

Figure 10:
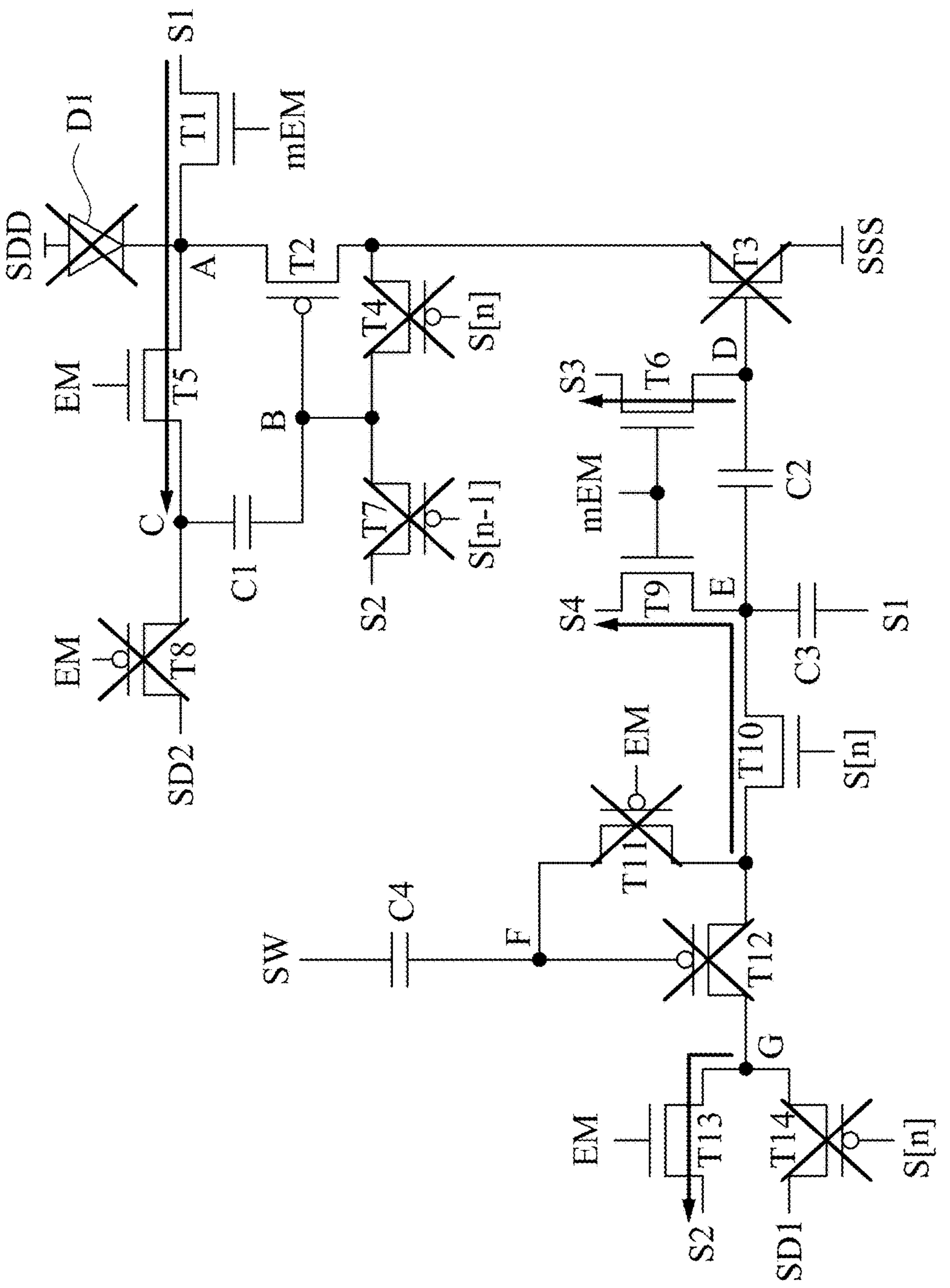
FIG. 10 is an operation scenario diagram illustrating a display driving device according to an embodiment of the present disclosure.

FIG. 10 illustrates an operation scenario of a display driving device according to an embodiment of the present disclosure. As shown in FIG. 10, in some embodiments, FIG. 10 may represent the operation of the display driving device 100A during the period P5 or P9 of the timing diagram 200B (as shown in FIG. 2). The operation of FIG. 10 during period P5 or P9 is similar to the operation of FIG. 7 during period P2, and for brevity, it will not be further elaborated here.

In some embodiments, the period P5 or P9 occurs after period P2, but the present disclosure is not limited to this.

Figure 11:
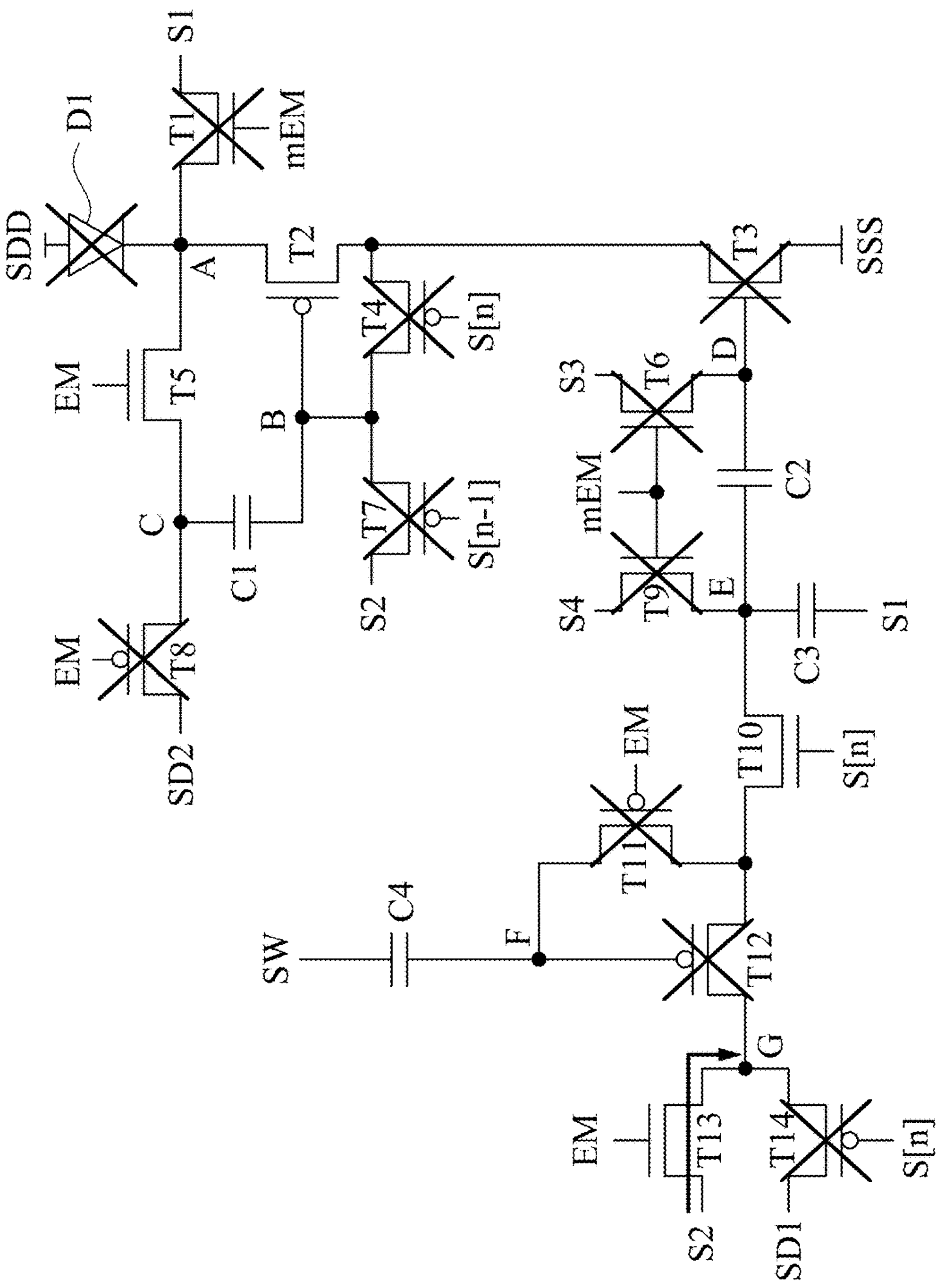
FIG. 11 is an operation scenario diagram illustrating a display driving device according to an embodiment of the present disclosure.

FIG. 11 illustrates an operation scenario of a display driving device according to an embodiment of the present disclosure. As shown in FIG. 11, in some embodiments, FIG. 11 may represent the operation of the display driving device 100A during the period P6 or P10 of the timing diagram 200B (as shown in FIG. 2). The operation of FIG. 11 during period P6 or P10 is similar to the operation of FIG. 8 during period P3, and for brevity, it will not be further elaborated here.

In some embodiments, the period P6 or P10 occurs after period P3, but the present disclosure is not limited to this.

Figure 12:
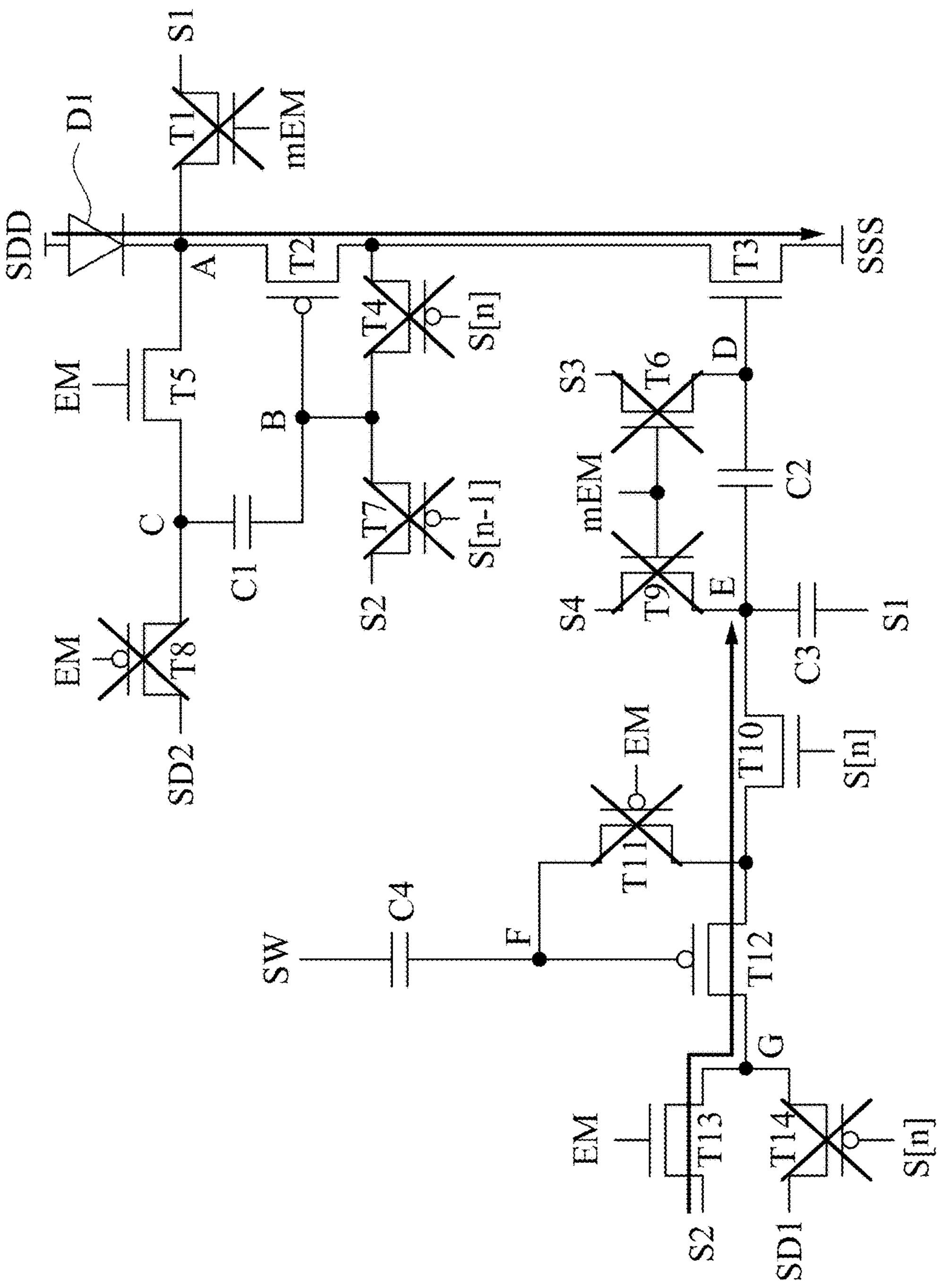
FIG. 12 is an operation scenario diagram illustrating a display driving device according to an embodiment of the present disclosure.

FIG. 12 illustrates an operation scenario of a display driving device according to an embodiment of the present disclosure. As shown in FIG. 12, in some embodiments, FIG. 12 may represent the operation of the display driving device 100A during the period P7 or P11 of the timing diagram 200B (as shown in FIG. 2). The operation of FIG. 12 during period P7 or P11 is similar to the operation of FIG. 9 during period P4, and for brevity, it will not be further elaborated here.

In some embodiments, the period P7 or P11 occurs after period P4, but the present disclosure is not limited to this.

Figure 13:
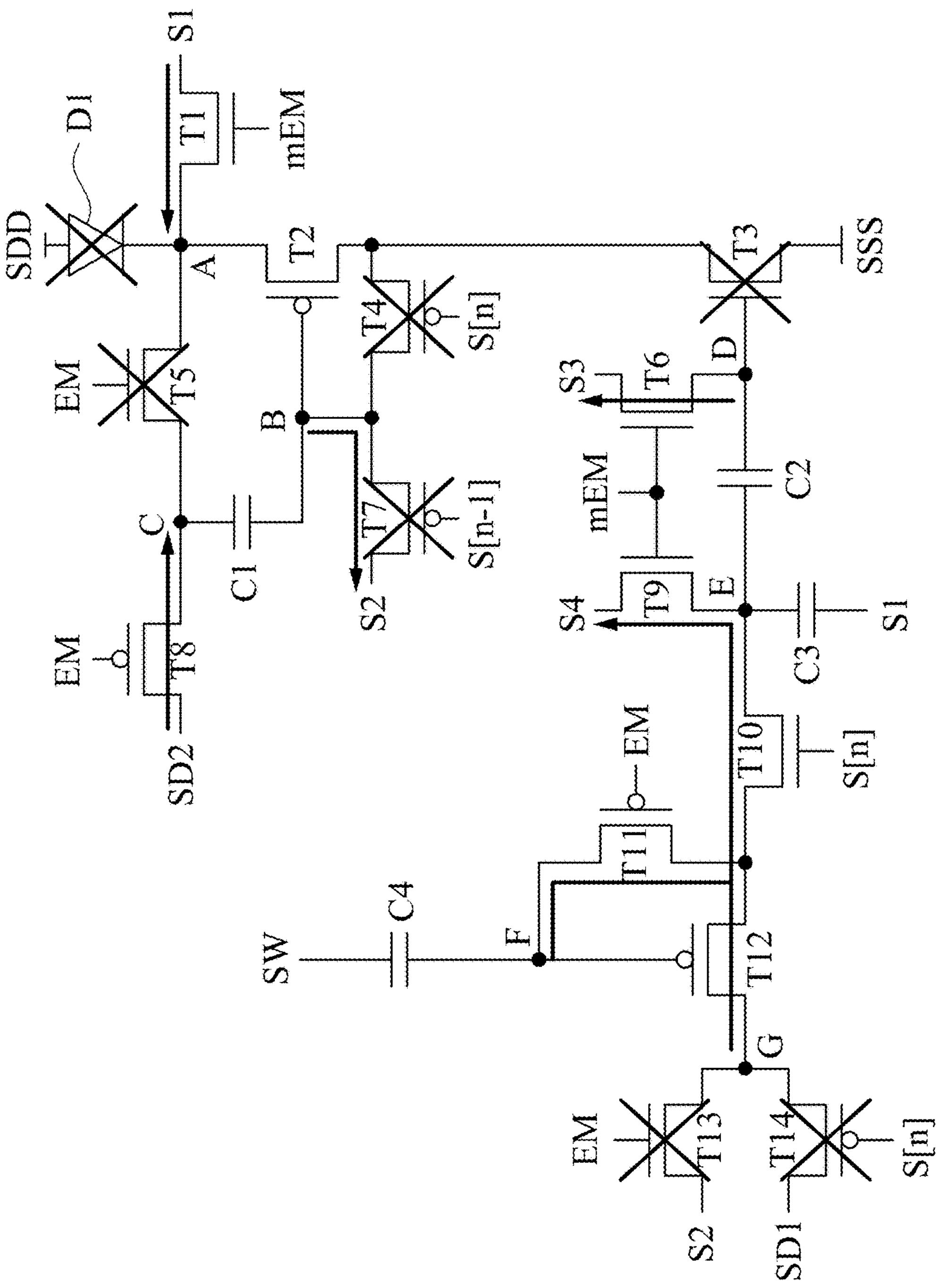
FIG. 13 is an operation scenario diagram illustrating a display driving device according to an embodiment of the present disclosure.

FIG. 13 illustrates an operation scenario of a display driving device according to an embodiment of the present disclosure. As shown in FIG. 13, in some embodiments, FIG. 13 may depict a part of the operation of the display driving device 100A executing the timing diagram 200B from FIG. 4.

For example, FIG. 13 may represent the operation of the display driving device 100A during the period F0 or P12 of the timing diagram 200B, and the operation of the display driving device 100A during period F0 is similar to the operation during period P12, but the present disclosure is not limited to this.

Please refer to FIG. 2, FIG. 4, and FIG. 13 together. In one embodiment, during the period P12, the light-emitting circuit 110A adjusts the voltage levels at the terminal C and the terminal B according to the data signal SD2.

For instance, during the period P12, the transistors T3, T4, T5, T7 of the light-emitting circuit 110A may be turned off. Transistor T1 is turned on according to the lighting signal mEM, and transistor T1 provides the pull-up signal S1 to terminal A to adjust the voltage level at the terminal A to the voltage level V1. Transistor T8 is turned on according to the lighting signal EM, and transistor T8 provides the data signal SD2 to terminal C to adjust the voltage level at the terminal C to the voltage level VD2.

In this embodiment, during the period P12, the control circuit 121A adjusts the voltage level at the terminal F according to the pull-down signal S4.

For example, during the period P12, the transistors T13, T14 of the driving circuit 120A may be turned off. Transistor T9 is turned on according to the lighting signal mEM, transistor T10 is turned on according to the scan signal S[n], and transistor T11 is turned on according to the lighting signal EM. The transistors T9 to T11 provide the pull-down signal S4 to terminal F to adjust the voltage level at the terminal F to the voltage level V4. Transistor T12 is turned on according to the voltage level V4 of terminal F, and the transistors T9, T10, T12 provide the pull-down signal S4 to terminal G to adjust the voltage level at the terminal G to the voltage level (V4+[VTH_T12]), but the present disclosure is not limited to this.

In this embodiment, during the period P12, the boost circuit 122A adjusts the voltage levels at the terminal E and terminal D according to the pull-down signal S4 and the pull-down signal S3.

For example, during the period P12, transistor T4 provides the pull-down signal S4 to terminal E to adjust the voltage level at the terminal E to the voltage level V4. Transistor T6 is turned on according to the lighting signal mEM, and transistor T6 provides the pull-down signal S3 to terminal D to adjust the voltage level at the terminal D to the voltage level V3, but the present disclosure is not limited to this.

In some embodiments, during the period P12, the voltage level at the terminal B may be considered a floating voltage level.

For example, the voltage level at the terminal B may be the voltage level (VD2−$|VTH_{T2}|$) or the voltage level V2, but the present disclosure is not limited to this.

In some embodiments, the period F0 occurs before periods P1 to P4, and the period P12 occurs after periods P1 to P4.

In some embodiments, the period F0 or P12 may be referred to as the Turn off Period, but the present disclosure is not limited to this.

Figure 14:
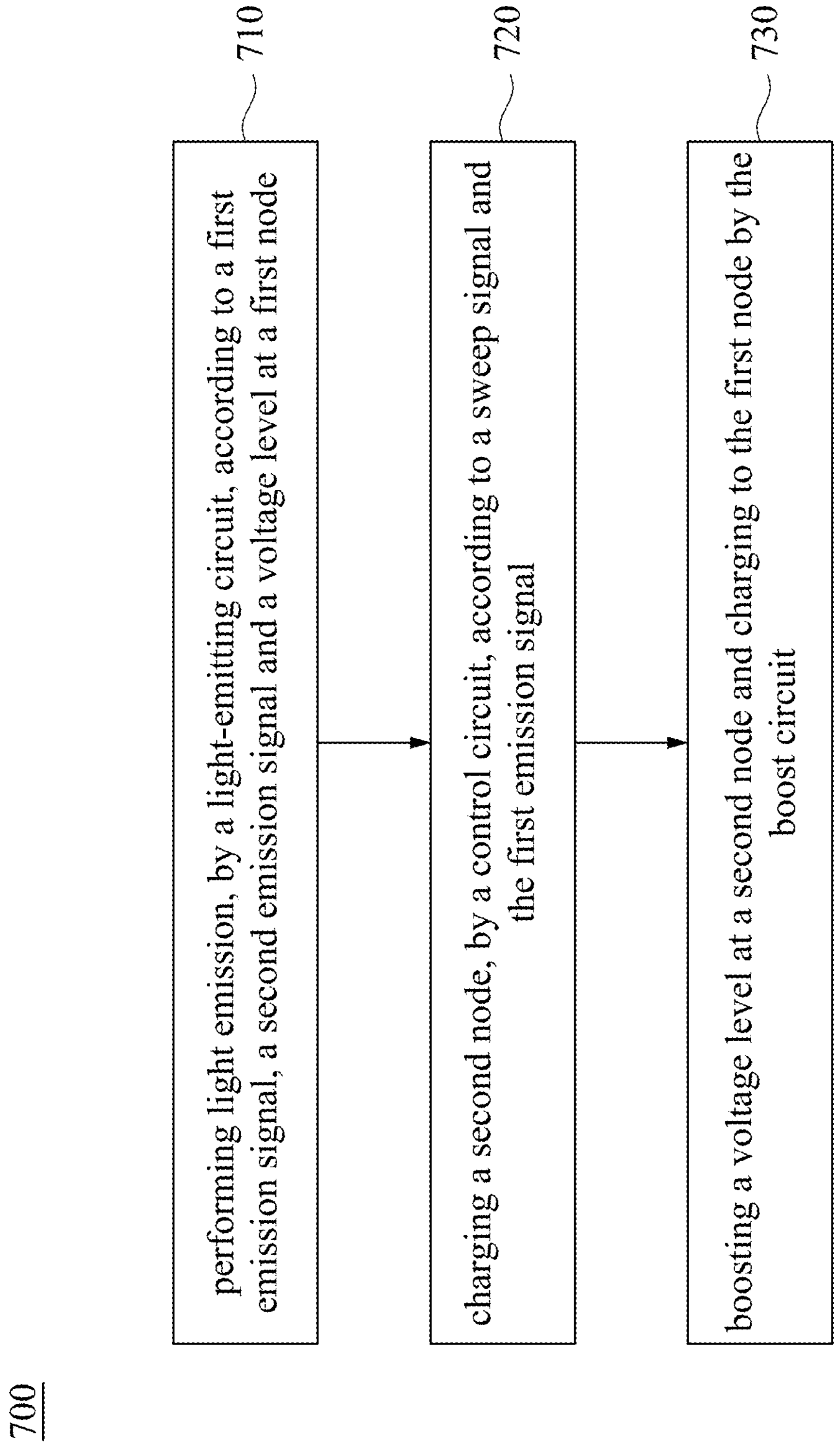
FIG. 14 is a flowchart illustrating the steps of a display driving method according to an embodiment of the present disclosure.

FIG. 14 illustrates a flowchart of a display driving method according to an embodiment of the present disclosure. As shown in FIG. 14, the display driving method 700 includes steps 710 to 730, with the details of the steps of the display driving method 700 described as follows.

In step 710, the light-emitting is performed by the light-emitting circuit based on the first light-emitting signal, the second light-emitting signal, and the voltage level at a first node.

In one embodiment, please refer to FIG. 1, FIG. 2, and FIG. 14. The light-emitting circuit 110A can perform light-emitting based on the light-emitting signal EM, the light-emitting signal mEM, and the voltage level at the node N1. For example, the operation of the display driving method 700 is similar to the operation of the display driving device 100A in FIG. 2. For brevity, the description of other operations in the display driving method 700 is omitted here.

In step 720, the second node is charged by the control circuit according to the sweep signal and the first light-emitting signal.

In one embodiment, please refer to FIG. 1, FIG. 2, and FIG. 14. The control circuit 121A can charge node N2 based on the sweep signal SW and the light-emitting signal EM. For example, the operation of the display driving method 700 is similar to the operation of the display driving device 100A in FIG. 2. For brevity, the description of other operations in the display driving method 700 is omitted here.

In step 730, the voltage level at the second node is boosted and charged to the first node by the boost circuit.

In one embodiment, please refer to FIG. 1, FIG. 2, and FIG. 7. The boost circuit 122A can boost the voltage level at the node N2 and charge it to node N1. The voltage level at the node N1 is greater than the voltage level at the node N2. For example, the operation of the display driving method 700 is similar to the operation of the display driving device 100A in FIG. 2. For brevity, the description of other operations in the display driving method 700 is omitted here.

In one embodiment, please refer to FIG. 1, FIG. 2, and FIG. 14. The light-emitting circuit 110A includes a light-emitter D1 and a compensation circuit 112A. The cathode terminal of the light-emitter D1 is coupled to the compensation circuit 112A, and the anode terminal of the light-emitter D1 receives the power supply signal SDD. For example, the operation of the display driving method 700 is similar to the operation of the display driving device 100A in FIG. 2. For brevity, the description of other operations in the display driving method 700 is omitted here.

In one embodiment, please refer to FIG. 1, FIG. 2, and FIG. 14. The display driving method 700 further includes the following step: discharging node N1 and node N2 by the boost circuit 122A based on the light-emitting signal mEM. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 5, and FIG. 14. In one embodiment, the display driving method 700 further includes the following step: during period P0, adjusting the voltage levels at the terminal C and the terminal B by the light-emitting circuit 110A based on the data signal SD2 and the charging signal S2. The light-emitting circuit 110A includes a capacitor C1, the control circuit 121A includes a capacitor C4, and the boost circuit 122A includes a capacitor C2. Capacitor C1 includes terminal C and terminal B, capacitor C4 includes terminal F, and capacitor C2 includes terminal E and terminal D. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 5, and FIG. 14. In one embodiment, the display driving method 700 further includes the following steps: during period P0, adjusting the voltage level at the terminal F by the control circuit based on the pull-down signal S4; and during period P0, adjusting the voltage levels at the terminal E and the terminal D by the boost circuit 122A based on the pull-down signal S4 and the pull-down signal S3. The voltage level of the pull-down signal S3 is greater than the voltage level of the pull-down signal S4. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 6, and FIG. 14. In one embodiment, the display driving method 700 further includes the following step: during period P1, adjusting the voltage level at the terminal B by the light-emitting circuit 110A based on the pull-up signal S1 and the threshold voltage level |VTH_T2|. The light-emitting circuit 110A further includes a driving transistor T2, and the driving transistor T2 has a threshold voltage level |VTH_T2|. The control circuit 121A further includes a control transistor T12, and the control transistor T12 has a threshold voltage level |VTH_T12|. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 6, and FIG. 14. In one embodiment, the display driving method 700 further includes the following step: during period P1, adjusting the voltage level at the terminal F by the control circuit 121A based on the data signal SD and the threshold voltage level |VTH_T12|. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 7, and FIG. 14. In one embodiment, the display driving method 700 further includes the following step: during period P2, adjusting the voltage levels at the terminal C and the terminal B by the light-emitting circuit 110A based on the pull-up signal S1. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 8, and FIG. 14. In one embodiment, the display driving method 700 further includes the following steps: during period P3, adjusting the voltage level at the terminal F by the control circuit 121A based on the voltage change level ΔSW1 of the sweep signal SW; and during period P3, turning off the control transistor T12 based on the voltage level at the terminal F. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 9, and FIG. 14. In one embodiment, the display driving method 700 further includes the following steps: during period P4, adjusting the voltage levels at the terminal C and the terminal B by the light-emitting circuit 110A based on the power supply signal SDD and the light-emitting diode voltage level (VLED); and during the fifth period P4, outputting the driving signal (ILED) by the driving transistor T2 based on the voltage level at the terminal B, and the light-emitter D1 emits light according to the driving signal (ILED). The light-emitter D1 of the light-emitting circuit 110A has a light-emitting diode voltage level (VLED). For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 9, and FIG. 14. In one embodiment, the display driving method 700 further includes the following steps: during period P4, adjusting the voltage level at the terminal F by the control circuit 121A based on the voltage change level ΔSW2 of the sweep signal SW, and turning on the control transistor T12 based on the voltage level at the terminal F; and during the fifth period, adjusting the voltage levels at the terminal E and the terminal D by the boost circuit 122A based on the charging signal S2, and the switch (e.g., transistor T3) of the light-emitting circuit 110A is turned on based on the voltage level at the terminal D. For example, the operation of the display driving method 700 is similar to the operation of the display driving device 100A in FIG. 2. For brevity, the description of other operations in the display driving method 700 is omitted here.

Please refer to FIG. 2, FIG. 4, FIG. 8, and FIG. 13. In one embodiment, the display driving method 700 further includes the following steps: during period P12, adjusting the voltage levels at the terminal C and the terminal B by the light-emitting circuit 110A based on the data signal SD2; during period P12, adjusting the voltage level at the terminal F by the control circuit 121A based on the pull-down signal S4; and during period P12, adjusting the voltage levels at the terminal E and the terminal D by the boost circuit 122A based on the pull-down signal S4 and the pull-down signal S3. For example, the operation of the display driving method 700 is similar to the operation of the display driving device 100A in FIG. 2. For brevity, the description of other operations in the display driving method 700 is omitted here.

In some embodiments, the display driving device 100A of the present disclosure is a circuit architecture composed of 14 transistors and 4 capacitors, and the display driving device 100A can be applied to Micro LED tiled displays.

In some embodiments, the display driving device 100A of the present disclosure can self-compensate for variations in the threshold voltages of thin-film transistors T2 and T12 and variations in the voltage drop (I-R drop) of the power supply signal SDD. The display driving device 100A can use a pulse width modulation (PWM) driving method to achieve optimal light-emission efficiency across all grayscale levels of the Micro LED.

In some embodiments, some driving devices may have more than 4 transistors in the light-emission current path. However, the display driving device 100A of the present disclosure can achieve power savings by reducing the number of thin-film transistors (TFTs) in the light-emission current path (e.g., to 2).

In some embodiments, the boost circuit 122A in the display driving device 100A of the present disclosure can further reduce the cross-voltage between the voltage level VDD and the voltage level VSS through capacitive coupling of high voltage, thereby achieving reduced power consumption.

From the above embodiments of the present disclosure, it is understood that the application of the present disclosure has the following advantages. The display driving device and display driving method shown in the embodiments of the present disclosure can increase the turn-on voltage of transistors in the light-emitting circuit through the boost circuit, thereby achieving the effect of operating the transistors in the linear region.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display driving device, comprising:

a light-emitting circuit, coupled to a first node, and configured to emit light based on a first light-emitting signal and a voltage level at the first node; and a control circuit, coupled to a second node, and configured to charge the second node based on a sweep signal and the first light-emitting signal; and a boost circuit, configured to boost a voltage level at the second node and charge the first node; and wherein the voltage level at the first node is greater than the voltage level at the second node, wherein the light-emitting circuit comprises a first capacitor, wherein the control circuit comprises a second capacitor, wherein the boost circuit comprises a third capacitor;

wherein the first capacitor comprises a first terminal and a second terminal, wherein the second capacitor comprises a third terminal, wherein the third capacitor comprises a fourth terminal and a fifth terminal;

wherein during a first period, the light-emitting circuit adjusts a voltage level at the first terminal and a voltage level at the second terminal based on a first data signal and a charging signal;

wherein during the first period, the control circuit adjusts a voltage level at the third terminal based on a first pull-down signal;

wherein during the first period, the boost circuit adjusts a voltage level at the fourth terminal and a voltage level at the fifth terminal based on the first pull-down signal and a second pull-down signal; and wherein a voltage level at the first pull-down signal is greater than a voltage level at the second pull-down signal.

2. The display driving device of claim 1, wherein the boost circuit is further configured to discharge the first node and the second node based on a second light-emitting signal.

3. The display driving device of claim 2, wherein the light-emitting circuit is further configured to perform light emission based on the second light-emitting signal;

and wherein the second light-emitting signal is different from the first light-emitting signal.

4. The display driving device of claim 1, wherein the light-emitting circuit further comprises a driving transistor, wherein the driving transistor has a first threshold voltage level; wherein the control circuit further comprises a control transistor, and the control transistor has a second threshold voltage level; wherein during a second period, the light-emitting circuit adjusts the voltage level at the second terminal based on a pull-up signal and the first threshold voltage level; and wherein during the second period, the control circuit adjusts the voltage level at the third terminal based on a second data signal and the second threshold voltage level.

5. The display driving device of claim 4, wherein during a third period, the light-emitting circuit adjusts the voltage level at the first terminal and the voltage level at the second terminal based on the pull-up signal.

6. The display driving device of claim 5, wherein during a fourth period, the control circuit adjusts the voltage level at the third terminal based on a first voltage change level of the sweep signal;

and wherein during the fourth period, the control transistor turns off based on the voltage level at the third terminal.

7. The display driving device of claim 6, wherein during a fifth period, the control circuit adjusts the voltage level at the third terminal based on a second voltage change level of the sweep signal, and the control transistor is turned on based on the voltage level at the third terminal;

wherein during the fifth period, the boost circuit adjusts the voltage level at the fourth terminal and the voltage level at the fifth terminal based on the charging signal, and a switch of the light-emitting circuit is turned on based on the voltage level at the fifth terminal;

wherein a light emitter of the light-emitting circuit has a light emitter voltage level; and wherein during the fifth period, the light-emitting circuit adjusts the voltage level at the first terminal and the voltage level at the second terminal based on a power supply signal and the light emitter voltage level, and the driving transistor outputs a driving signal based on the voltage level at the second terminal, as such the light emitter emits light based on the driving signal.

8. The display driving device of claim 7, wherein:

during a sixth period, the light-emitting circuit adjusts the voltage level at the first terminal and the voltage level at the second terminal based on the first data signal;

during the sixth period, the control circuit adjusts the voltage level at the third terminal based on the first pull-down signal; and during the sixth period, the boost circuit adjusts the voltage level at the fourth terminal and the voltage level at the fifth terminal based on the first pull-down signal and the second pull-down signal.

9. A display driving device, comprising:

a light-emitting circuit comprising, a driving transistor, configured to control a pulse amplitude of a driving current provided to a light emitter according to a pulse amplitude modulation data voltage; and, a transistor, connected in series with the driving transistor between a trace of a power supply signal and a trace of a pull-down signal;

a boost circuit, connected to a gate terminal of the transistor; and a control circuit, connected through the boost circuit to the gate terminal of the transistor, configured to control the transistor according to a pulse width modulation data voltage and a sweep signal to control a pulse width of the driving current, and wherein the boost circuit is configured to boost a voltage level at the gate terminal of the transistor when the control circuit turns on the transistor, wherein the light-emitting circuit comprises a first capacitor, wherein the control circuit comprises a second capacitor, wherein the boost circuit comprises a third capacitor;

wherein the first capacitor comprises a first terminal and a second terminal, wherein the second capacitor comprises a third terminal, wherein the third capacitor comprises a fourth terminal and a fifth terminal;

wherein during a first period, the light-emitting circuit adjusts a voltage level at the first terminal and a voltage level at the second terminal based on a first data signal and a charging signal;

wherein during the first period, the control circuit adjusts a voltage level at the third terminal based on a first pull-down signal;

wherein during the first period, the boost circuit adjusts a voltage level at the fourth terminal and a voltage level at the fifth terminal based on the first pull-down signal and a second pull-down signal; and wherein a voltage level at the first pull-down signal is greater than a voltage level at the second pull-down signal.

10. The display driving device of claim 9, wherein the boost circuit comprising:

a boost capacitor, coupled between the control circuit and the gate terminal of the transistor, configured to boost the voltage level at the gate terminal of the transistor.

11. A display driving method for driving a display driving device, wherein the display driving device comprising a light-emitting circuit, a control circuit and a boost circuit, wherein the light-emitting circuit is coupled to a first node, wherein the control circuit is coupled to a second node different from the first node, wherein the boost circuit coupled between the light-emitting circuit and the control circuit, wherein the display driving method comprises:

performing light emission, by the light-emitting circuit, based on a first light-emitting signal, a second light-emitting signal, and a voltage level at the first node;

charging the second node, by the control circuit, based on a sweep signal and the first light-emitting signal; and boosting a voltage level at the second node and charging the first node by the boost circuit, and wherein the voltage level at the first node is greater than the voltage level at the second node, wherein the light-emitting circuit comprises a first capacitor, wherein the control circuit comprises a second capacitor, wherein the boost circuit comprises a third capacitor, wherein the first capacitor comprises a first terminal and a second terminal, wherein the second capacitor comprises a third terminal, wherein the third capacitor comprises a fourth terminal and a fifth terminal, wherein the display driving method further comprises:

during a first period, adjusting a voltage level at the first terminal and a voltage level at the second terminal, by the light-emitting circuit, based on a first data signal and a charging signal; and during the first period, adjusting a voltage level at the third terminal, by the control circuit, based on a first pull-down signal; and during the first period, adjusting a voltage level at the fourth terminal and a voltage level at the fifth terminal, by the boost circuit, based on the first pull-down signal and a second pull-down signal, and wherein a voltage level at the first pull-down signal is greater than a voltage level at the second pull-down signal.

12. The display driving method of claim 11, further comprising:

discharging the first node and the second node, by the boost circuit, based on the second light-emitting signal.

13. The display driving method of claim 12, further comprising:

performing the light emission, by the light-emitting circuit, based on the second light-emitting signal, and wherein the second light-emitting signal is different from the first light-emitting signal.

14. The display driving method of claim 11 wherein the light-emitting circuit further comprises a driving transistor, wherein the driving transistor has a first threshold voltage level, wherein the control circuit further comprises a control transistor, wherein the control transistor has a second threshold voltage level, wherein the display driving method further comprises: during a second period, adjusting the voltage level at the second terminal, by the light-emitting circuit, based on a pull-up signal and the first threshold voltage level; and during the second period, adjusting the voltage level at the third terminal, by the control circuit, based on a second data signal and the second threshold voltage level.

15. The display driving method of claim 14, further comprising:

during a third period, adjusts the voltage level at the first terminal and the voltage level at the second terminal, by the light-emitting circuit, based on the pull-up signal.

16. The display driving method of claim 15, further comprising:

during a fourth period, adjusting the voltage level at the third terminal, by the control circuit, based on a first voltage change level of the sweep signal; and during the fourth period, turning off the control transistor based on the voltage level at the third terminal.

17. The display driving method of claim 16, wherein a light emitter of the light-emitting circuit has a light emitter voltage level, wherein the display driving method further comprises:

during a fifth period, adjusting the voltage level at the third terminal, by the control circuit, based on a second voltage change level of the sweep signal, and turning on the control transistor based on the voltage level at the third terminal;

during the fifth period, adjusting the voltage level at the fourth terminal and the voltage level at the fifth terminal, by the boost circuit, based on the charging signal, and turning on a switch of the light-emitting circuit based on the voltage level at the fifth terminal; and during the fifth period, adjusting the voltage level at the first terminal and the voltage level at the second terminal, by the light-emitting circuit, based on a power supply signal and the light emitter voltage level, and outputting a driving signal, by the driving transistor, based on the voltage level at the second terminal, as such the light emitter emits light based on the driving signal.

18. The display driving method of claim 17, further comprises:

during a sixth period, adjusting the voltage level at the first terminal and the voltage level at the second terminal, by the light-emitting circuit, based on the first data signal;

during the sixth period, adjusting the voltage level at the third terminal, by the control circuit, based on the first pull-down signal; and during the sixth period, adjusting the voltage level at the fourth terminal and the voltage level at the fifth terminal, by the boost circuit, based on the first pull-down signal and the second pull-down signal.

* * * * *